(12) United States Patent
Fukuda et al.

(10) Patent No.: US 8,710,829 B2
(45) Date of Patent: Apr. 29, 2014

(54) SHEET COIL TYPE RESOLVER

(75) Inventors: Takako Fukuda, Nagano (JP); Takaaki Ochiai, Nagano (JP)

(73) Assignee: Minebea Co., Ltd., Kitasaku-gun (JP)

( * ) Notice: Subject to any disclaimer, the term of this patent is extended or adjusted under 35 U.S.C. 154(b) by 689 days.

(21) Appl. No.: 12/813,231

(22) Filed: Jun. 10, 2010

(65) Prior Publication Data

US 2010/0321007 A1 Dec. 23, 2010

(30) Foreign Application Priority Data

Jun. 19, 2009 (JP) ................................. 2009-147028
Aug. 25, 2009 (JP) ................................. 2009-194144

(51) Int. Cl.
G01B 7/30 (2006.01)

(52) U.S. Cl.
USPC .................................................. 324/207.25

(58) Field of Classification Search
USPC .................................................. 324/207.25
See application file for complete search history.

(56) References Cited

U.S. PATENT DOCUMENTS 5,150,115 A * 9/1992 deJong et al. ............ 340/870.31
6,239,571 B1 5/2001 Shimahara

FOREIGN PATENT DOCUMENTS

| JP | 55-078909 U | 11/1953 |
| JP | 55-78909 U | 11/1980 |
| JP | 08-084449 A | 3/1996 |
| JP | 08-136211 A | 5/1996 |
| JP | 11-325964 A | 11/1999 |
| JP | 2000-292205 A | 10/2000 |
| JP | 2001-314069 A | 11/2001 |
| JP | 2008-197046 A | 8/2008 |
| JP | 2010-151602 A | 7/2010 |

* cited by examiner

*Primary Examiner* — Reena Aurora
(74) *Attorney, Agent, or Firm* — Foley & Lardner LLP

(57) ABSTRACT

A sheet coil type is provided in which a detection coil of two phases is disposed at a stator section and structured such that a coil of sine phase a coil of cosine phase are circumferentially arranged alternately on the same plane, wherein the distance between an excitation coil at a rotor section and the coil of sine phase at the stator section is identical to the distance between the excitation coil at the rotor section and the coil of cosine phase at the stator section, whereby the difference in amplitude between at a sine phase output and at a cosine phase output is eliminated.

16 Claims, 27 Drawing Sheets

Coil pattern structure of resolver rotor coil portion

Coil pattern structure of resolver stator coil portion

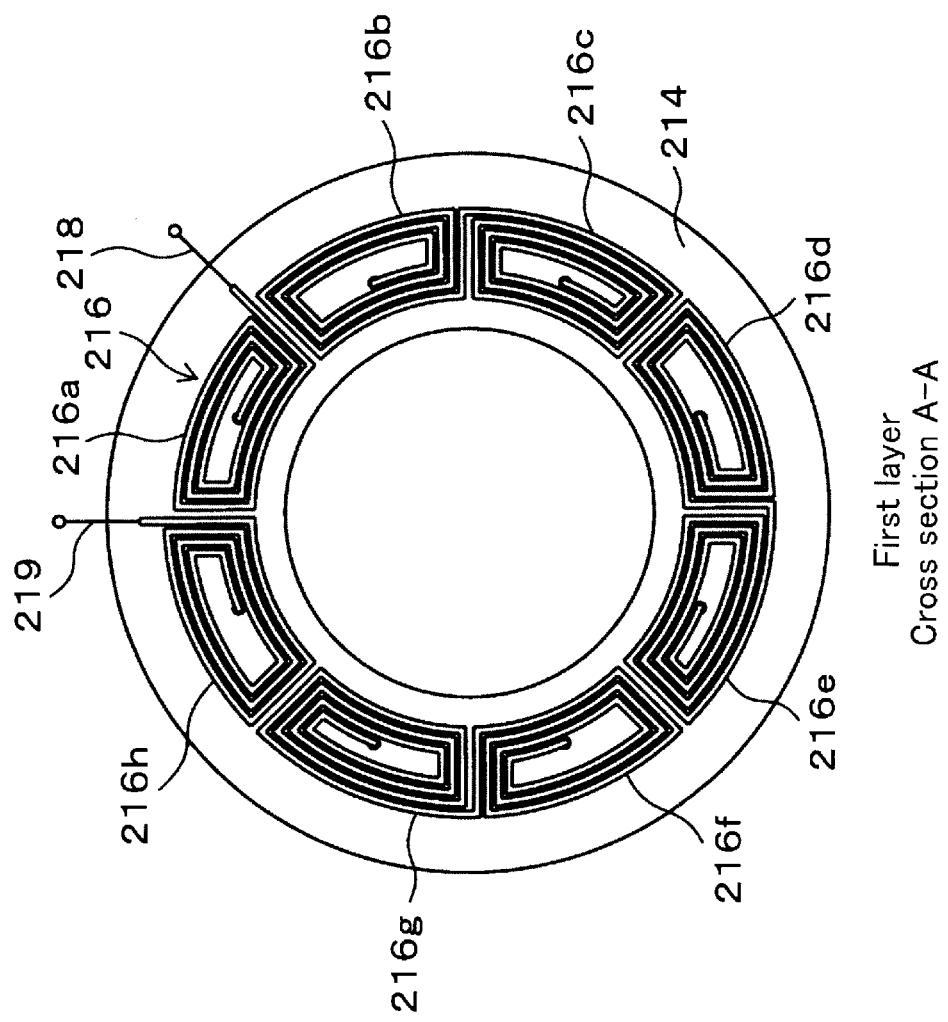

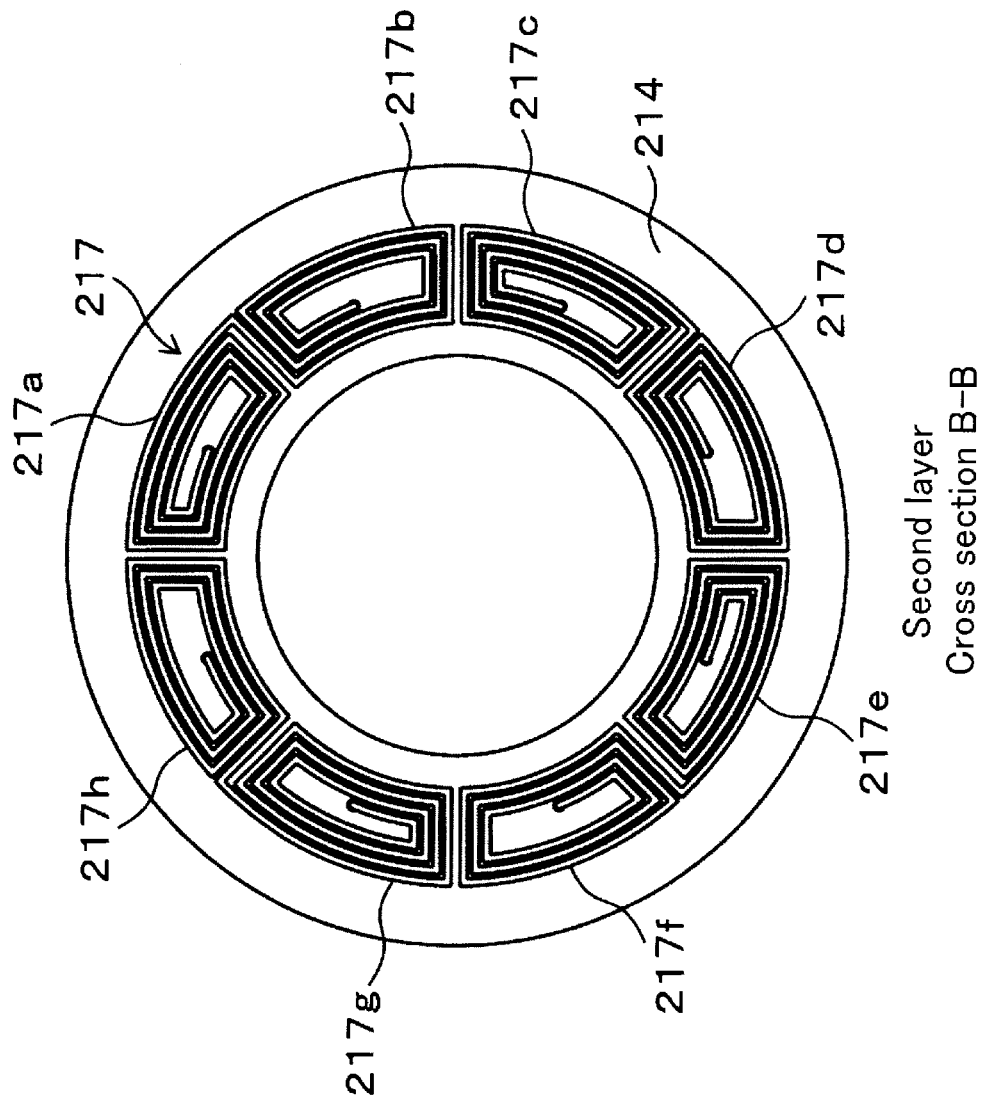

Output waveforms on the Comparative Example

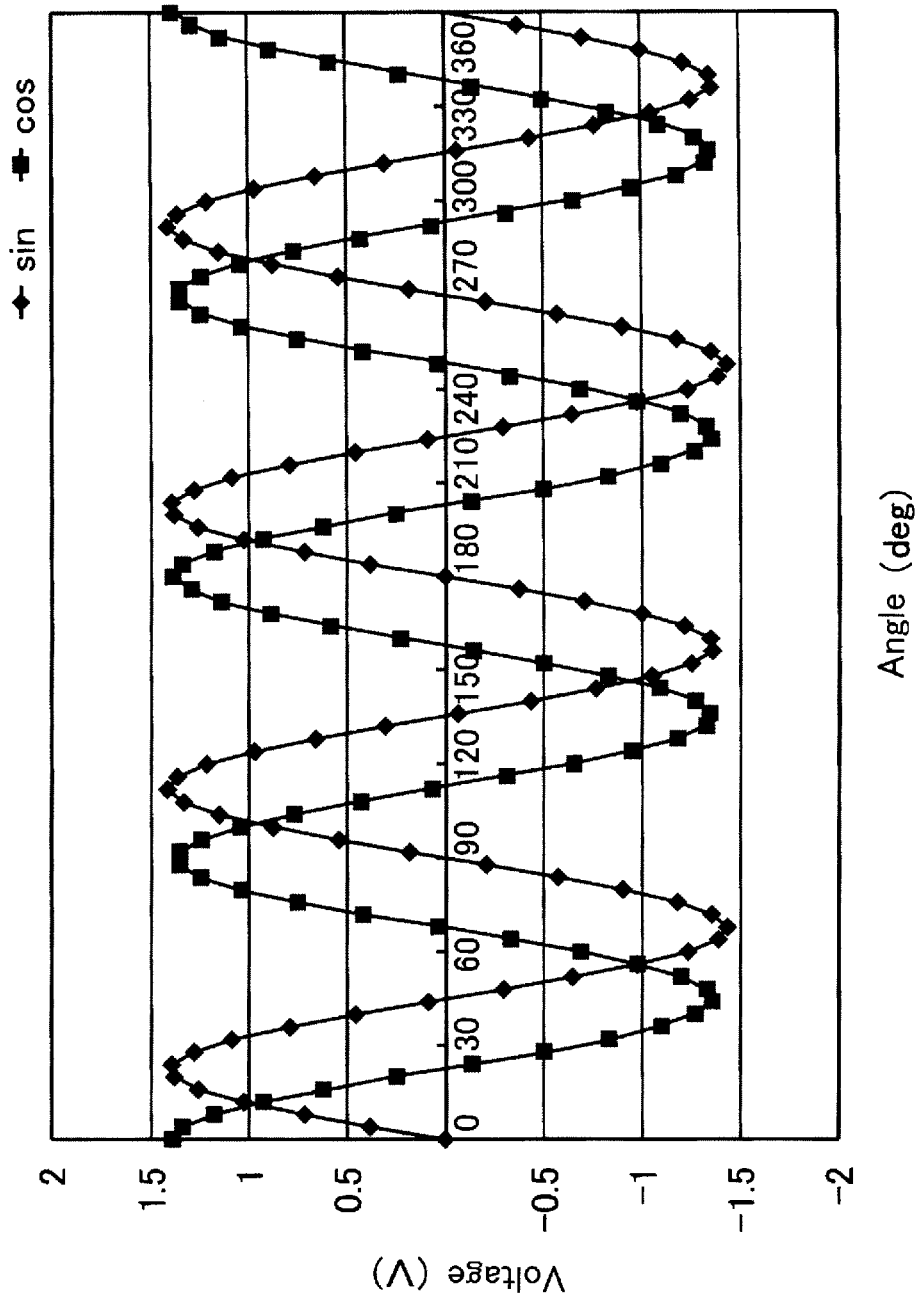

Single phase input – Two phase output

Two phase input – Single phase output

Coil pattern structure of resolver rotor coil portion

Coil pattern structure of resolver stator coil portion

Output waveforms on the Embodiment Example

SHEET COIL TYPE RESOLVER

BACKGROUND OF THE INVENTION

1. Field of the Invention

The present invention relates to a sheet coil type resolver in which sheet coils are employed as electrical conductors.

2. Description of the Related Art

A conventional sheet coil type resolver is disclosed which includes a one-phase excitation coil and a two-phase detection coil disposed to oppose the excitation coil with a distance therebetween wherein the one-phase excitation coil is constituted by a flat sheet coil such that each pole of X pole-pairs has an electrical angle of 180 degrees and wherein the two-phase detection coil includes an A-phase coil and a B-phase coil and is constituted by a flat sheet coil such that the two phases have a phase difference of 90 degrees from each other in terms of electrical angle (refer to, for example, Japanese Patent Applications Laid-Open Nos. H8-84449 and H8-136211).

A sheet coil type resolver disclosed in Japanese Patent Application Laid-Open No. H8-84449 includes a detection coil structured such that an A-phase coil pattern is formed on one surface of an insulation sheet and a B-phase coil pattern is formed on the other surface of the insulation sheet.

In a sheet coil type resolver disclosed in Japanese Patent Application Laid-Open No. H8-136211, an excitation coil is disposed at a rotor section, and a transformer coil (secondary winding) to supply excitation current to the excitation coil is disposed radially inside the excitation coil of the rotor section. The aforementioned two coils are disposed to face a disk-shaped rotor core. Another transformer coil (primary winding) is disposed at a stator section and located to oppose the transformer coil (secondary winding) disposed at the rotor section, and a transformer coil unit is composed by the two transformer coils arranged as described above. On the other hand, the stator section includes A-phase and B-phase detections coils which are disposed in two layers such that the A-phase detection coil is formed on one surface of an insulation sheet and the B-phase detection coil is formed on the other surface of the insulation sheet and which are located corresponding to the excitation coil of the rotor section, and a resolver coil is formed by the excitation coil and the A- and B-phase coil patterns of the detection coil.

However, when the A-phase coil pattern and the B-phase coil pattern are formed on respective different surfaces of the insulation sheet as described in Japanese Patent Applications Laid-Open Nos. H8-84449 and H8-136211, the distance defined between the A-phase coil pattern and the excitation phase differs from the distance defined between the B-phase coil pattern and the excitation phase, and therefore the output level of the A-phase coil pattern is caused to differ from the output level of the B-phase coil pattern. The difference in the output level causes deterioration in detection angle precision.

Also, such a resolver as described above has the problem described below. When a resolver has a relatively small number of axial multiple angle, for example, an axial multiple angle of 1X, each of both the A-phase and the B-phase coils is structured such that two rectangular spiral coil patterns circumferentially curved are each formed to extend halfway along the circumference wherein the coil patterns each include wirings extending circumferentially and disposed concentrically to one another and turn-back wirings extending radially and located toward the both circumferential end portions of the curved rectangular coil pattern.

When electric current is caused to flow in the coil described above and a magnetic flux is thereby formed, the magnetic flux variation, while staying substantially constant at the circumferential center portion of the coil pattern, becomes heavily concentrated at the circumferential end portions of the coil pattern. This is attributable to the fact that the wirings extending circumferentially and the wirings extending radially for turn-back are disposed contiguously at the circumferential end portions of the coil pattern, which has influence on the magnetic flux condition there. The influence increases with an increase in number of the axial multiple angle. The above phenomenon causes the output voltage distribution of the detection phase coil at each axis angle to deviate from a sine wave distribution. Specifically, it happens that since the change of detection output is substantially constant at the center portion of the phase, the waveform deviates from a sine wave distribution. If this happens, the detection angle precision is lowered.

SUMMARY OF THE INVENTION

The present invention has been made in light of the above circumstances and it is an object of the present invention to provide a sheet coil type resolver enabled to reduce the deterioration of detection angle precision which results from the difference between a distance from a sine phase coil pattern disposed at a stator section to a coil pattern disposed at a rotor section and a distance from a cosine phase coil pattern disposed at the stator section to the coil pattern disposed at the rotor section wherein the sine and cosine phase coil patterns disposed at the stator section constitute an excitation coil or a detection coil while the coil pattern disposed at the rotor section constitutes a detection phase or an excitation phase.

Further, it is an object of the present invention to provide a sheet coil type resolver in which the coil pattern is formed so that the voltage induced at the detection phase has a sine wave distribution even when the number of axial multiple angle is relatively small, whereby the detection angle precision is enhanced.

In order to achieve the objects described above, according to an aspect of the present invention there is provided a sheet coil type resolver including: a resolver stator coil portion comprising a plurality of stator coil patterns which have a planar shape and which are disposed circumferentially on the same plane, wherein the plurality of stator coil patterns constitute a coil group of two phases having a phase difference of a mechanical angle of 90 degrees from each other; and a resolver rotor coil portion disposed to axially oppose the resolver stator coil portion with a distance therebetween.

In the aspect of the present invention, the plurality of stator coil patterns may be disposed such that a stator coil pattern of a first phase and a stator coil pattern of a second phase are arranged alternately on the same plane.

In the aspect of the present invention, the resolver stator coil portion may be arranged such that two adjacent stator coil patterns are circumferentially shifted from each other by a mechanical angle of $(90/(m \times n))$ degrees in case of a resolver axial multiple angle of nX where n is an integer of one or more and m is an integer of one or more.

In the aspect of the present invention, the resolver rotor coil portion may include a plurality of rotor coil patterns which have a planar shape, each have an area size corresponding to the sum area size of two adjacent stator coil patterns, and which are circumferentially connected in series to one another thereby constituting a coil group of one phase.

In the aspect of the present invention, the resolver stator coil portion may include a plurality of stator coil pattern layers, the plurality of stator coil patterns constituting the coil group of two phases may be formed in each of the plurality of stator coil pattern layers and at the same time connected to one another between the stator coil pattern layers, and the number of the stator coil patterns to constitute the coil group of two phases in one stator coil pattern layer may be identical to the number of the stator coil patterns to constitute the coil group of two phases in any of other stator coil pattern layers.

In the aspect of the present invention, the resolver rotor coil portion may include a plurality of rotor coil pattern layers, and the plurality of rotor coil patterns may be formed in each of the plurality of rotor coil pattern layers and at the same time connected to one another between the rotor coil pattern layers.

In the aspect of the present invention, the resolver rotor coil portion may constitute an excitation phase and the resolver stator coil portion may constitute a detection phase.

In the aspect of the present invention, the resolver stator coil may constitute an excitation phase and the resolver rotor coil portion may constitute a detection phase.

In the aspect of the present invention, the coil group of two phases may include a sine phase coil group and a cosine phase coil group in each of which stator coil patterns of the same phase are disposed in every other position circumferentially on the same plane and connected in series to one another, two adjacent stator coil patterns on the one same plane may be shifted circumferentially by a mechanical angle of 22.5 degrees, and the resolver axial multiple angle may be 4X.

In the aspect of the present invention, each of at least one of the plurality of stator coil patterns and the plurality of rotor coil patterns may have a substantially rectangular spiral shape and include an outer circumferential pattern portion, an inner circumferential pattern portion and a turn-back pattern portion connecting between the outer circumferential pattern portion and the inner circumferential pattern portion, and the turn-back pattern portion may have a larger pattern conductor width than the outer circumferential pattern portion and the inner circumferential pattern portion.

In the aspect of the present invention, each of the plurality of rotor coil patterns may have a substantially rectangular spiral shape and include an outer circumferential pattern portion, an inner circumferential pattern portion and a turn-back pattern portion connecting between the outer circumferential pattern portion and the inner circumferential pattern portion, and the turn-back pattern portion may have a larger pattern conductor width than the outer circumferential pattern portion and the inner circumferential pattern portion.

In the aspect of the present invention, the layout of each of the turn-back pattern portions may be arranged by means of adjusting, in accordance with a shape of the stator coil pattern, at least one of widths of the turn-back pattern conductors and distances respectively defined between two adjacent turn-back pattern conductors, whereby a waveform of an output signal whose amplitude varies according to a rotation angle of a rotor has a sine waveform.

In the aspect of the present invention, the layout of each of the turn-back pattern portions may be arranged by means of adjusting, in accordance with the shape of the stator coil pattern, widths of the turn-back pattern conductors, whereby a waveform of an output signal whose amplitude varies according to the rotation angle of a rotor has a sine waveform.

In the aspect of the present invention, the widths of the turn-back pattern conductors may be different from one another.

In the aspect of the present invention, the layout of each of the turn-back pattern portions may be arranged by means of adjusting, in accordance with the shape of the stator coil pattern, distances respectively defined between two adjacent turn-back pattern conductors, whereby a waveform of an output signal whose amplitude varies according to the rotation angle of a rotor has a sine waveform.

In the aspect of the present invention, the distances respectively defined between two adjacent turn-back pattern conductors may be different from one another.

BRIEF DESCRIPTION OF THE DRAWINGS

FIGS. 4A, 4B and 4C are various views of a two-layer structured resolver rotor coil unit of the sheet coil type resolver of FIG. 2, wherein FIG. 4A shows a radial cross section of a coil pattern structure at a first layer taken along A-A (refer to FIG. 4C), FIG. 4B shows a radial cross section of a coil pattern structure at a second layer taken along B-B (refer to FIG. 4C), and FIG. 4C shows a partly axial cross section of the two-layer structured resolver rotor coil unit;

FIGS. 5A, 5B and 5C are various views of a two-layer structured resolver stator coil unit for the sheet coil type resolver of FIG. 2, wherein FIG. 5A shows a radial cross section of a coil pattern structure at a first layer taken along A-A (refer to FIG. 5C), FIG. 5B shows a radial cross section of a coil pattern structure at a second layer taken along B-B (refer to FIG. 5C), and FIG. 5C shows a partly axial cross section of the two-layer structured resolver stator coil unit;

FIG. 6A and FIG. 6B are measurement graphs of output waveforms at a resolver stator coil unit with two phases (sine-phase coil and cosine-phase coil) of a resolver coil unit having a wiring of a single-phase input and two-phase output structure, wherein FIG. 6A refers to a Comparative Example and FIG. 6B refers to an Embodiment Example;

DETAILED DESCRIPTION OF THE INVENTION

Exemplary embodiments of the present invention will hereinafter be described with reference to the accompanying drawings.

Figure 1:
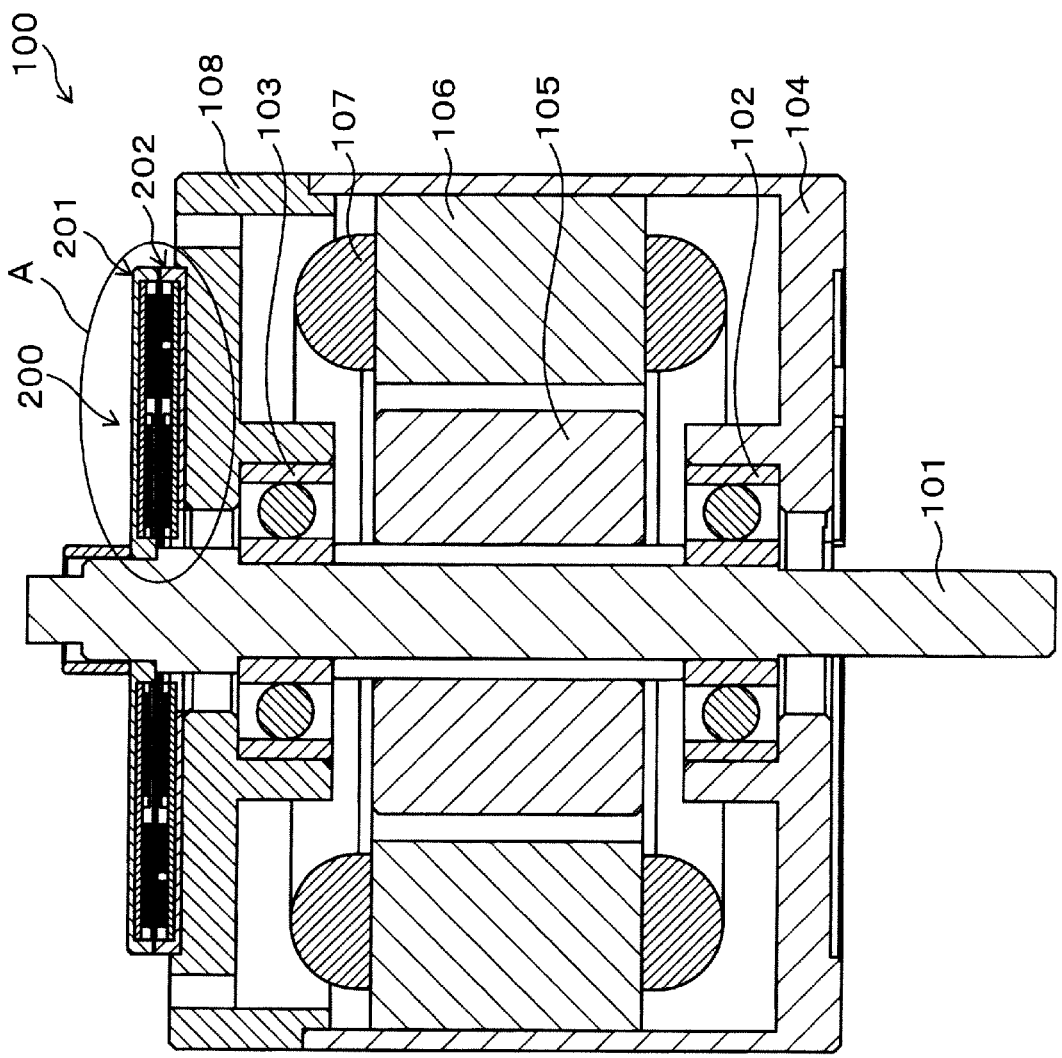
FIG. 1 is an axial cross sectional view of a sheet coil type resolver according to a first embodiment of the present invention attached to a motor.

Description will first be made of an entire assembly structure with reference to FIG. 1. FIG. 1 shows an axial cross section of an assembly structure in which a sheet coil type resolver 200 according to a first embodiment of the present invention is attached to a motor 100. The motor 100 is an AC servo motor and includes a rotary shaft 101. The rotary shaft 101 is supported by bearings 102 and 103. The bearing 102 is attached to a motor housing 104 and the bearing 103 is attached to a rear end cap 108 fixed to the rear end (upper side in the figure) of the motor housing 104. Thus, the rotary shaft 101 is supported rotatably with respect to the motor housing 104. A motor rotor 105 constituted by a permanent magnet having a plurality of magnetic poles is attached to the rotary shaft 101.

A motor stator core 106 is disposed to radially oppose the motor rotor 105. The motor stator core 106 is made of a magnetic material, such as silicon steel, and fixed to the motor housing 104. The motor stator core 106 includes a plurality of salient poles which correspond in number to the magnetic poles of the motor rotor 105, wherein the salient poles circumferentially surround the motor rotor 105. The structure described above is common to general AC servo motors and detailed description thereof will be omitted.

Motor windings 107 are disposed on the motor stator core 106. The terminals (not shown) of each of the motor windings 107 are led out and connected to a motor drive circuit (not shown).

At the rear end (upper side in the figure) of the motor 100 described above, the sheet coil type resolver 200 earlier mentioned is attached in a unified manner. The sheet coil type resolver 200 includes a rotor section 201 and a stator section 202. The rotor section 201 is fixed to the rotary shaft 101 and the stator section 202 is fixed to the rear end cap 108 (at the motor housing 104). When the rotary shaft 101 rotates with respect to the motor housing 104, the rotor section 201 is caused to rotate with respect to the stator section 202.

Figure 2:
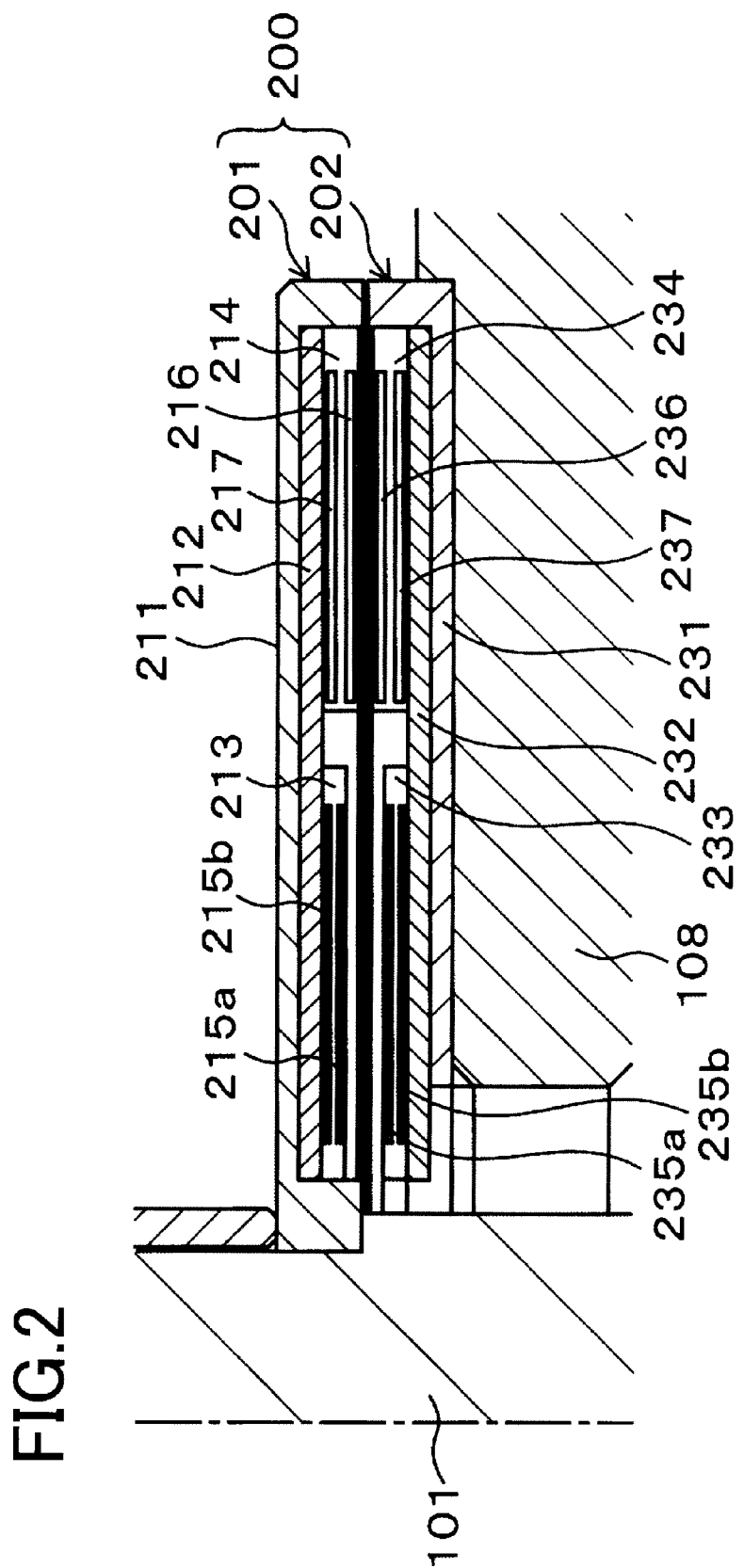
FIG. 2 is an enlarged view of a part (enclosed by an ellipse A in FIG. 1) of the sheet coil type resolver according to the first embodiment.
Figure 3:
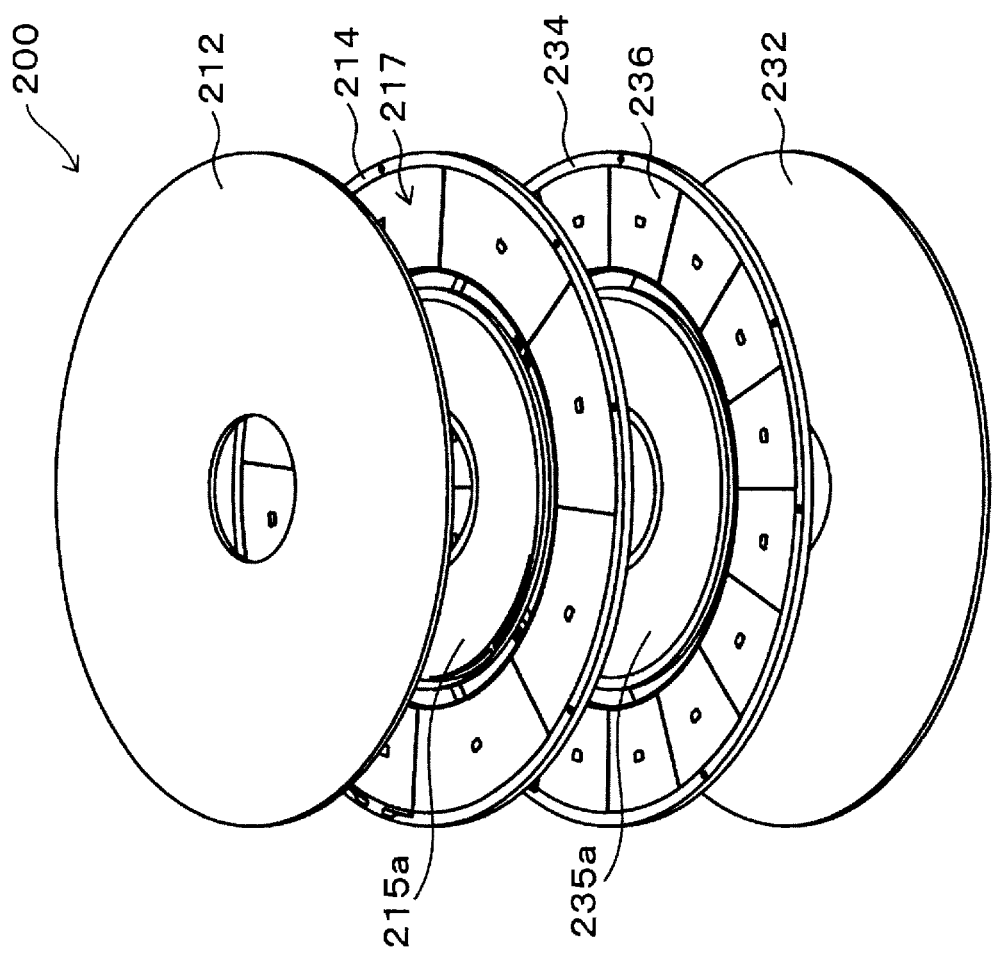
FIG. 3 is an exploded perspective view of a relevant portion of the sheet coil type resolver of FIG. 2.

Description will then be made of the general composition of the sheet coil type resolver 200. FIG. 2 shows an enlarged cross section of a part of the sheet coil type resolver 200 and FIG. 3 shows disassembled parts of a relevant portion of the sheet coil type resolver 200. Referring to FIG. 2, the sheet coil type resolver 200 includes the rotor section 201 and the stator section 202 as described above. The rotor section 201 and the stator section 202 are disposed to axially oppose each other with an air gap therebetween and are adapted to be rotatable with respect to each other. As will be described later, the sheet coil type resolver 200 has an axial multiple angle nX where n=4.

Description will now be made of the rotor section 201. The rotor section 201 has a circular disk shape with a round central opening (thus forming a flat doughnut configuration). The rotor section 201 includes a rotor yoke 211 which has a circular disk shape with a round central opening and which includes an annular recessed area around the central opening on one surface. The rotor section 201 is fixed around the rotary shaft 101 (refer to FIG. 1) put through the central opening of the rotor section 201. The rotor yoke 211 is made of a non-magnetic material and a rotor core 212 is closely housed in the recessed area of the rotor yoke 211. The rotor core 212 is made of a magnetic material and has a circular disk shape with a round central opening (flat doughnut configuration) as shown in FIG. 3.

A first insulation sheet 213 and a second insulation sheet 214 are fixed to a surface (lower side in the figure) of the rotor core 212 opposite to a surface facing the rotor yoke 211. The first and second insulation sheets 213 and 214 are thin resin sheets having an annular shape (doughnut shape) wherein the first insulation sheet 213 has a smaller annular diameter than the second insulation sheet 214 such that the first insulation sheet 213 is located radially inside the second insulation sheet 214 (closer to the rotary shaft 101).

A first rotor transformer coil 215a is embedded in one surface layer (lower side in the figure) of the first insulation sheet 213 and a second rotor transformer coil 215b is embedded in the other surface layer (upper side in the figure) of the first insulation sheet 213. Specifically, the first and second rotor transformer coils 215a and 215b are each constituted by a printed wiring which is formed in each of the opposite surface layers of the first insulation sheet 213 and which has a spiral geometry (not shown) around the rotary shaft 101 defined as the spiral center. The first and second rotor transformer coils 215a and 215b are series connected to each other in such a manner that currents respectively induced are caused to flow in the same direction in response to magnetic fluxes oriented in the same direction (same phase connection), and the both ends thereof are connected to resolver rotor coils (to be described later). The first and second rotor transformer coils 215a and 215b are supplied with excitation current from stator transformer coils (to be described later) by means of electromagnetic induction and are adapted to supply the excitation current to resolver rotor coils (to be described later).

The second insulation sheet 214 is attached to the rotor core 212 and located radially outside the first insulation sheet 213. The second insulation sheet 214 is also made of resin, a first resolver rotor coil 216 is disposed on one surface (lower side in FIG. 2) of the second insulation sheet 214 and a second resolver rotor coil 217 is disposed on the other surface (upper side in FIG. 2). The first and second resolver rotor coils 216 and 217 are each constituted by a printed wiring and have respective patterns shown in FIGS. 4A and 4B. In the present embodiment, the first and second resolver rotor coils 216 and 217 function as an excitation coil.

Figure 4C:
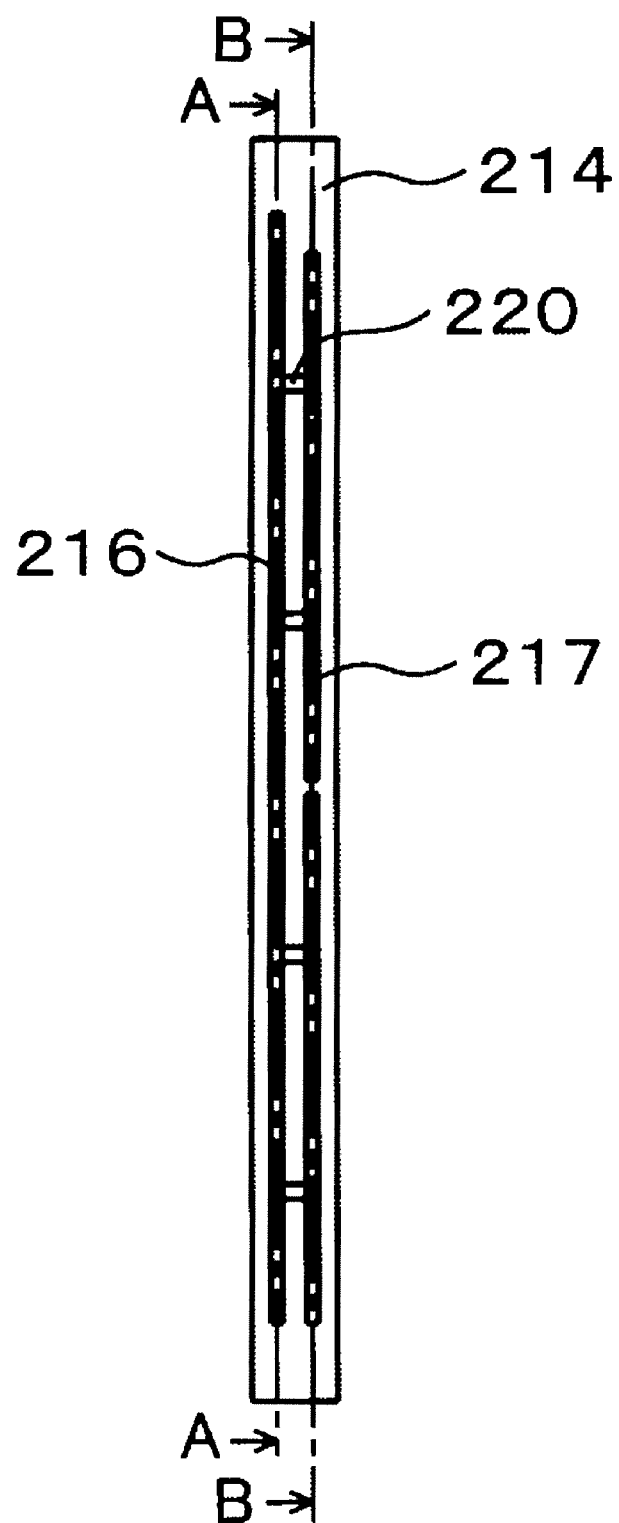

Description will hereinafter be made of the first and second resolver rotor coils 216 and 217. FIGS. 4A and 4C show respective radial cross sections of the first and second resolver rotor coils 216 and 217 (viewed from the lower side in FIG. 2), and FIG. 4C shows a partly axial cross section thereof. FIG. 4A shows the pattern at the first layer (the lower layer in FIG. 2), that is the first resolver rotor coil 216. And FIG. 4B shows the pattern at the second layer (the upper layer in FIG. 2), that is the second resolver rotor coil 217.

Referring to FIGS. 4A and 4B, eight circumferentially curved rectangular spiral coil patterns functioning as a resolver rotor coil are arranged circumferentially at each layer. Specifically, the first resolver rotor coil 216 includes resolver rotor coil patterns 216a to 216h as shown in FIG. 4A, and the second resolver rotor coil 217 includes resolver rotor coil patterns 217a to 217h as shown in FIG. 4B.

The resolver rotor coil patterns 216a to 216h are formed on one same plane wherein adjacent two thereof are circumferentially shifted from each other by a mechanical angle of 45 degrees (360 degrees/8). Also, the resolver rotor coil patterns 217a to 217h are formed on another same plane wherein adjacent two thereof are circumferentially shifted from each other by a mechanical angle of 45 degrees. The resolver coil patterns 216a to 216h are each wound clockwise starting from the outer circumference to the center of the coil when viewed from the lower side in FIG. 2 while the resolver rotor coil patterns 216a to 217h are each wound counterclockwise starting from the outer circumference to the center of the coil when viewed from the lower side in FIG. 2.

The first and second resolver rotor coils 216 and 217 interact mutually and constitute in combination a coil at the rotor section 201 of the resolver. In the present embodiment, a lead wire 218 is led out from the resolver rotor coil pattern 216a, a lead wire 219 is led out from the resolver rotor coil pattern 216h, and the lead wires 218 and 219 are connected to the first and second rotor transformer coils 215a and 215b.

Description will now be made of a connection structure of the resolver rotor coils in line with the flow of excitation current. The excitation current is an alternating current, but for the purpose of convenience the explanation will be made according to the excitation current flow starting from the lead wire 218.

The excitation current applied to the lead wire 218 is caused to flow spirally through the resolver rotor coil pattern 216a (the first layer) in the clockwise direction starting from the outer circumference to the center of the coil, pass through a conductor located in a through-hole (for example, a through-hole 220 shown in FIG. 4C) communicating the both surfaces of the second insulation sheet 214, and arrives at the resolver rotor coil pattern 217a (the second layer). The current then flows spirally through the resolver coil pattern 217a in the clockwise direction starting from the center of the coil to the outer circumference. According to the current flow described above, the magnetic flux produced by the resolver rotor coil pattern 216a (the first layer) has the same direction as the magnetic flux produced by the resolver rotor coil pattern 217a (the second layer), whereby the magnetic flux is increased on the whole. That is to say, in terms of the phase of the coil, the resolver rotor coil pattern 216a and the resolver rotor coil pattern 217a, which are located to overlap with each other when viewed from the axial direction, are in the same phase (inverted to the winding direction of the spiral).

The current which has passed through the resolver rotor coil pattern 217a arrives at the resolver rotor coil pattern 217b and flows spirally therethrough in the counterclockwise direction starting from the outer circumference of the coil to the center. Then, the current passes through a conductor located in a through-hole, arrives at the resolver rotor coil pattern 216b (the first layer) and flows spirally therethrough in the counterclockwise direction starting from the center of the coil to the outer circumference.

As shown from the current flowing through the resolver rotor coil patterns 216a and 216b as described above, the currents flowing respectively through adjacent two of the resolver rotor coil patterns 216a to 216h are caused to flow in the opposite spiral directions to each other, and the magnetic fluxes produced respectively by two adjacent resolver rotor coil patterns are directed opposite to each other. The same is applied to the current flow direction and the magnetic flux direction on the resolver rotor coil patterns 217a to 217h.

Thus, the excitation current applied to the lead wire 218 flows in the order of the resolver rotor coil patterns 216a, 217a, 217b, 216b, 216c, 217c, 217d, 216d, 216e, 217e, 217f, 216f, 216g, 217g, 217h and 216h and arrives at the lead wire 219. The excitation current is an alternating current and the current flow direction is inverted periodically, and when the current flow is reversed, the current flows in the reverse order starting from the lead wire 219 to the lead wire 218.

In the structure described above, two adjacent resolver rotor coil patters of the first resolver rotor coil 216 are connected in series to each other via the resolver rotor coil patterns of the second resolver rotor coil 217 disposed at the opposite surface. The same is applied to the connection of two adjacent resolver rotor coil patterns of the second resolver rotor coil 217.

In the structure of the rotor section 201 described above, when the rotary shaft 101 of the motor 100 rotates, the first and second rotor transformer coil 215a and 215b (refer to FIGS. 2 and 3) formed at the first insulation sheet 213 as well as the first and second resolver rotor coils 216 and 217 (refer to FIGS. 3 and 4) formed at the second insulation sheet 214 are caused to rotate together with the rotor section 201 in conjunction with the rotation of the rotary shaft 101.

The stator section 202 will hereinafter be described. Referring back to FIG. 2, the stator section 202 includes a stator yoke 231. The stator yoke 231 is made of a non-magnetic material and has a circular disk shape with a round central opening. The stator yoke 231 is fixed to the rear end cap 108 unified with the motor housing 104. A stator core 232 made of a magnetic material and having a circular disk shape with a round central opening (refer to FIG. 3) is fixed to the stator yoke 231.

A third insulation sheet 233 and a fourth insulation sheet 234 are fixedly attached to the stator core 232. The third and fourth insulation sheets 233 and 234 are thin resin sheets having an annular shape (doughnut shape) wherein the third insulation sheet 233 has a smaller annular diameter than the fourth insulation sheet 234 such that the third insulation sheet 233 is located radially inside the fourth insulation sheet 234 (so as to be closer to the rotary shaft 101).

A first stator transformer coil 235a is embedded in one surface layer (upper side in the figure) of the third insulation sheet 233 and a second stator transformer coil 235b is embedded in the other surface layer (lower side in the figure) of the third insulation sheet 233. Specifically, the first and second stator transformer coils 235a and 235b are each constituted by a printed wiring which is formed in each of the opposite surface layers of the third insulation sheet 233 and which has a spiral geometry (not shown) around the rotary shaft 101 defined as the spiral center. The first and second stator transformer coils 235a and 235b are series connected to each other so as to produce respective magnetic fluxes directed in the same direction, and the lead wires thereof are connected to a driving circuit (not shown) to output excitation current.

The first and second stator transformer coils 235a and 235b are magnetically coupled to the first and second rotor transformer coils 215a and 215b. When excitation current is applied to the first and second stator transformer coils 235a and 235b, current is induced at the first and second rotor transformer coils 215a and 215b, and the current induced is supplied, as excitation current, to the first and second resolver rotor coils 216 and 217.

A first resolver stator coil 236 is disposed on one surface (upper side in FIG. 2) of the fourth insulation sheet 234 and a second resolver stator coil 237 is disposed on the other surface (lower side in FIG. 2). The first and second resolver rotor coils 236 and 237 are each constituted by a printed wiring and have respective patterns shown in FIGS. 5A and 5B. In the present embodiment, the first and second resolver stator coils 236 and 237 function as a detection coil.

Figure 5A:
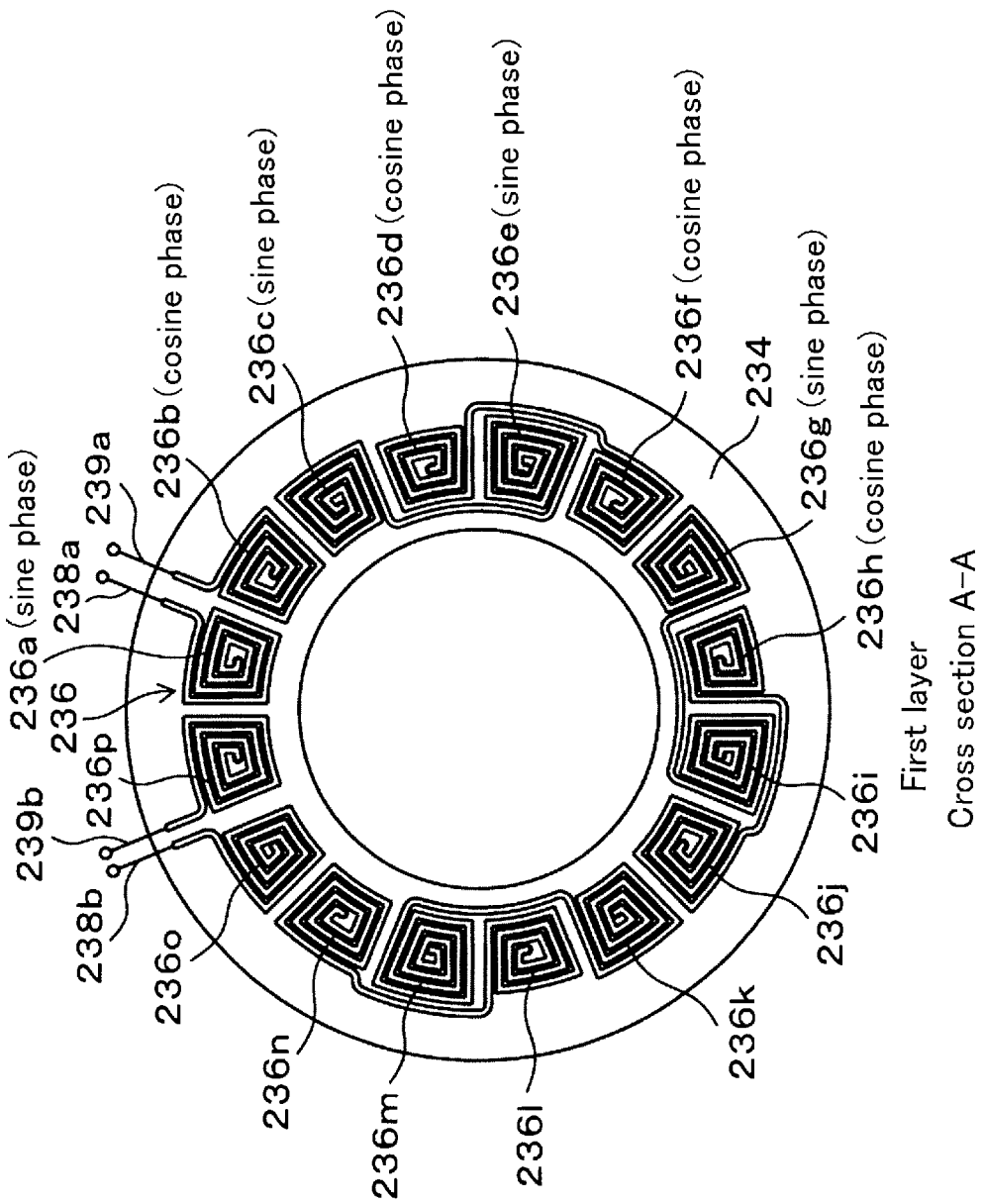

Description will hereinafter be made of the first and second resolver stator coils 236 and 237. FIGS. 5A and 5C show respective radial cross sections of the first and second resolver stator coils 236 and 237 (viewed from the upper side in FIG. 2), and FIG. 5C shows a partly axial cross section thereof. FIG. 5A shows coil patterns at the first layer (the upper layer in FIG. 2), that is the patterns of the first resolver stator coil 236. And FIG. 5B shows coil patterns at the second layer (the lower layer in FIG. 2), that is the patterns of the second resolver stator coil 237.

Figure 5B:
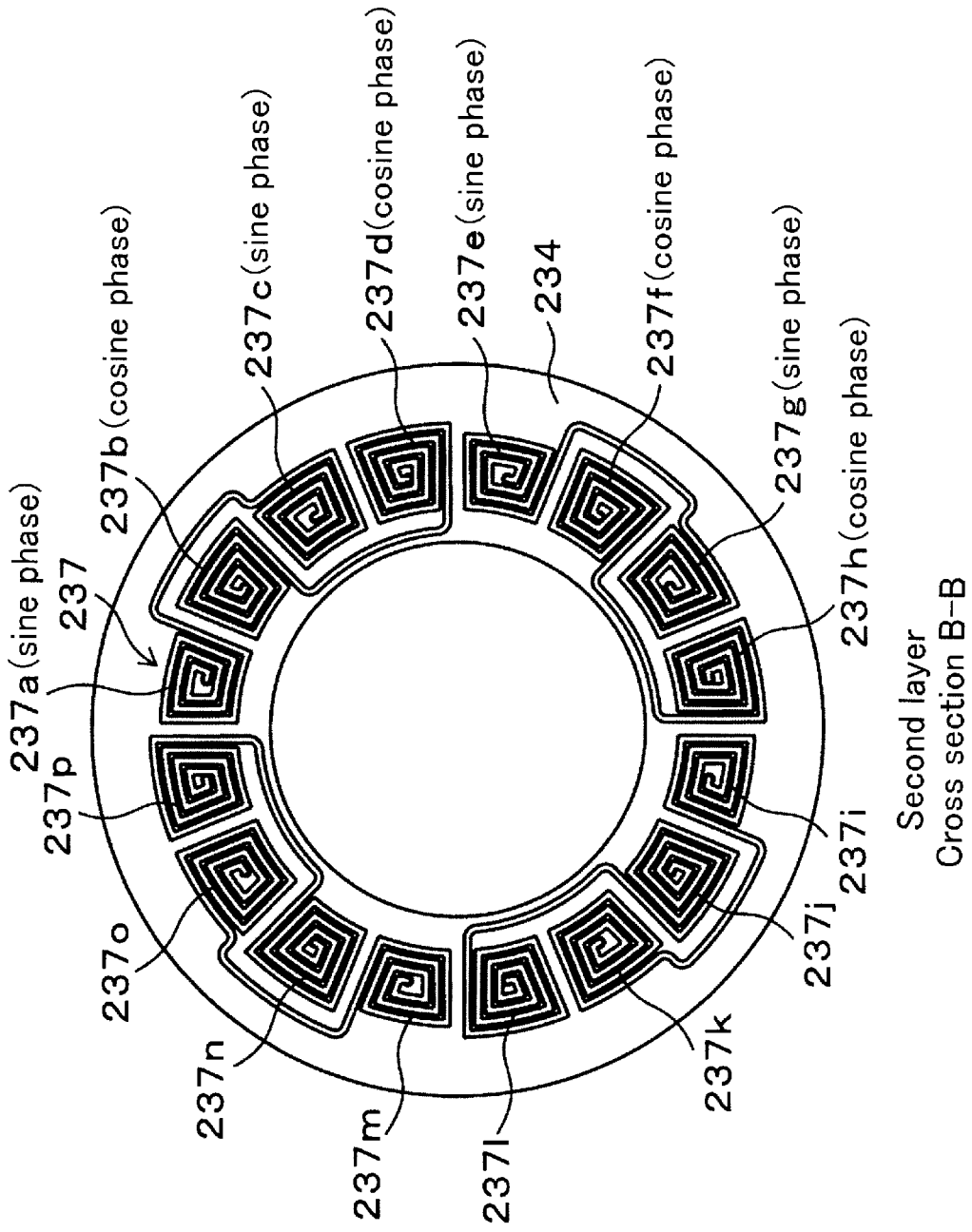
Figure 5C:
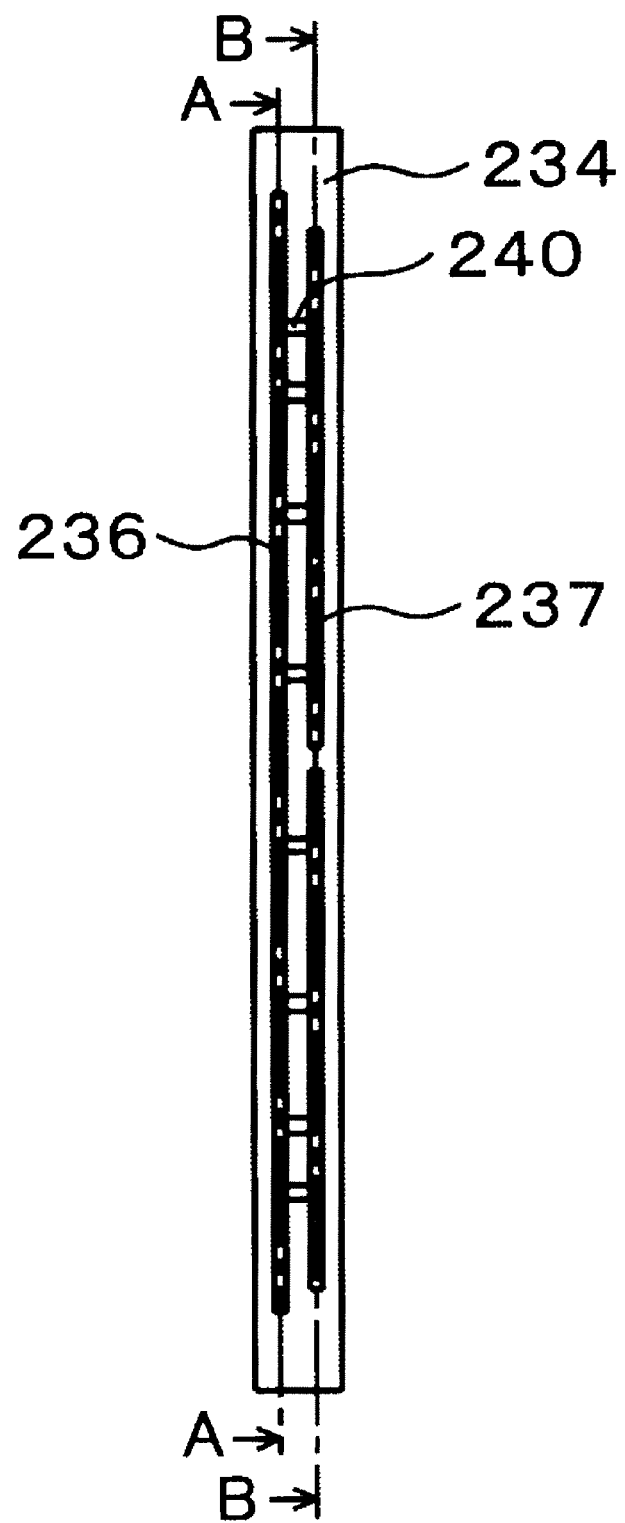

Referring to FIGS. 5A and 5B, sixteen circumferentially curved rectangular (substantially square) spiral coil patterns functioning as a resolver stator coil are formed to be arranged circumferentially at each layer. Specifically, the first resolver stator coil 236 includes resolver stator coil patterns 236a to 236p as shown in FIG. 4A, and the second resolver stator coil 237 includes resolver stator coil patterns 237a to 237p. The resolver stator coil patterns 236a to 236p are formed on one same plane and also the resolver stator coil patterns 237a to 237p are formed on another same plane.

The resolver stator coil patterns 236a, 236c, 236e, 236g, 236i, 236k, 236m and 236o are sine phase coils, and the resolver stator coil patterns 236b, 236d, 236f, 236h, 236j, 236l, 236n and 236p are cosine phase coils. On the other hand, the resolver stator coil patterns 237a, 237c, 237e, 237g, 237i, 237k, 237m and 237o are sine phase coils, and the resolver stator coil patterns 237b, 237d, 237f, 237h, 237j, 237l, 237n and 237p are cosine phase coils.

The first and second resolver stator coils 236 and 237 interact mutually and constitute in combination a coil at the stator section 202 of the resolver. In the present embodiment, sine phase lead wires 238a and 238b to output a sine phase output signal are led out from the resolver rotor stator patterns 236a and 236o, and cosine phase lead wires 239a and 239b to output a cosine phase output signal are led out from the resolver rotor coil patterns 236b and 236p. Though not illustrated, the sine phase lead wires 238a and 238b and the cosine phase lead wires 239a and 239b are pulled out of the sheet coil type resolver 200 and connected to an R/D converter (not shown) to calculate rotation angle.

The pattern connection structure of the resolver stator coils will hereinafter be described. Description will first be made of the connection structure of a coil group for the sine phase. The lead wire 238a is connected to the spiral outermost portion of the resolver stator coil pattern 326a in the first layer. The resolver stator coil pattern 326a is structured such that a conductor pattern starts from the connection point with the lead wire 238a, is wound spirally in the counterclockwise direction so as to get closer to the spiral innermost portion and arrives at the spiral center of the coil.

The conductor pattern having arrived at the spiral center of the coil goes through a through-hole (for example, a through-hole 240 shown in FIG. 5C) communicating between the both surfaces of the fourth insulation sheet 234, and arrives at the spiral center of the resolver stator coil pattern 237a in the second layer.

In the resolver stator coil pattern 237a, a conductor pattern starts from the spiral center, is wound spirally in the counterclockwise so as to get closer to and arrive at the spiral outermost portion of the coil, then extends circumferentially so as to go through a region located radially outward off the resolver stator coil pattern 237b disposed next to the resolver stator coil pattern 237a, and is connected to the radially outermost portion of the resolver stator coil pattern 237c. The resolver stator coil pattern 237c is structured such that a conductor pattern starts from the connection point, is wound spirally in the clockwise direction so as to get closer to the spiral innermost portion, arrives at the spiral center, goes through a through-hole and is connected to the spiral center of the resolver stator coil pattern 236c in the first layer.

In the resolver stator coil pattern 236c, a conductor pattern starts from the connection point, is wound spirally in the clockwise direction so as to get closer to and arrive at the spiral outermost portion, then extends circumferentially so as to go through a region located radially inward off the resolver stator coil pattern 236d disposed next to the resolver stator coil 236c, and is connected to the spiral outermost portion of the resolver stator coil pattern 236e.

With repetition of the conductor pattern connections described above, a conductor stating from the sine phase lead wire 238a runs via the resolver stator coil pattern 236a→237a→237c→
236c →236e→237e→237g→236g→236i→237i→237k→
236k→236m→237m→237o→236o and finally arrives at the sine phase lead wire 238b. This resolver stator coil pattern connection constitutes a sine phase output coil group to generate a sine phase output.

On the other hand, conductor patterns for a coil group for the cosine phase are connected in the same manner as the coil group for the sine phase as described above, and a conductor stating from the cosine phase lead wire 239a runs via the resolver stator coil pattern 236b→237d→237d→236d→236f→237f→237h→236h→
236j→237j→237l→236l→236n→237n→237p→236p and finally arrives at the cosine phase lead wire 239b. This resolver stator coil pattern connection constitutes a cosine phase output coil group to generate a cosine phase output.

In the connection structure described above, sine phase coil patterns and cosine phase coil patterns that are disposed on the same plane (one surface of an insulation sheet) are arranged alternately such that the coil patterns of the same phase are not located next to each other. On the other hand, the coil patterns of the same phase disposed on respective different planes (both surfaces of an insulation sheet) are located so as to axially overlap with each other thus matching the coil phases, so that when current is applied to one pair of lead wires, magnetic fluxes having the same direction are generated. Also, the winding and connection arrangement for the same phase coil patterns which are disposed in every other position on one same plane is made such that electric currents running through respective adjacent two coil patterns of one phase sandwiching one coil pattern of the other phase are caused to flow in respective opposite spiral directions.

Moreover, two resolver stator coil patterns disposed immediately next to each other circumferentially on one same plane correspond in size (area) to one resolver rotor coil pattern shown in FIG. 4a/4B. Specifically, it is arranged that, for example, the area covered by the resolver rotor coil pattern 216a (refer to FIG. 4A) overlaps axially with the aggregate area covered by the resolver stator coil patterns 236a and 236b which are disposed immediately next to each other in the circumferential direction.

Two adjacent resolver stator coil patterns are circumferentially shifted from each other by a mechanical angle of 22.5 degrees (360 degrees/16). In the case of the present embodiment, since n is 4 in the axial multiple angle nX, the mechanical angle between a sine phase coil pattern and a cosine phase coil pattern adjacent to the sine phase coil pattern is (90/(m× n)) degrees where m=1 and n=4. That is to say, the mechanical angle corresponding to one cycle in the axial multiple angle nX=4X is (360 degrees/4)=90 degrees, and a difference of 22.5 degrees obtained by further dividing equally the mechanical angle of 90 degrees into four is provided between two adjacent resolver stator patterns (sine phase output coil pattern and cosine phase output coil pattern) within the 90 degree angular range in order to achieve a phase difference ($2\pi/4$) of an electrical angle of 90 degrees.

Figure 7A:
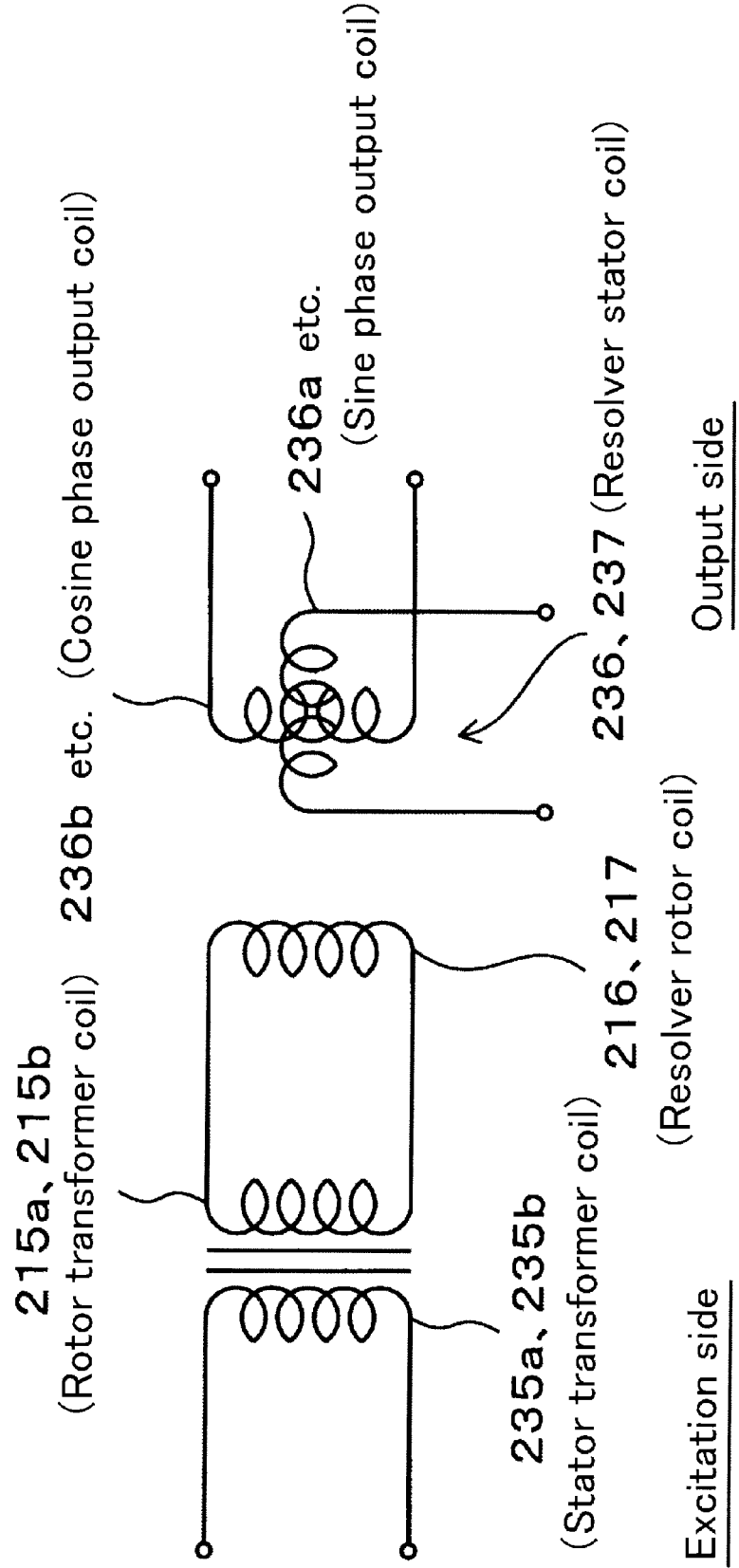
FIG. 7A is a resolver wiring diagram of a single-phase input and two-phase output structure according to the first embodiment.
Figure 7B:
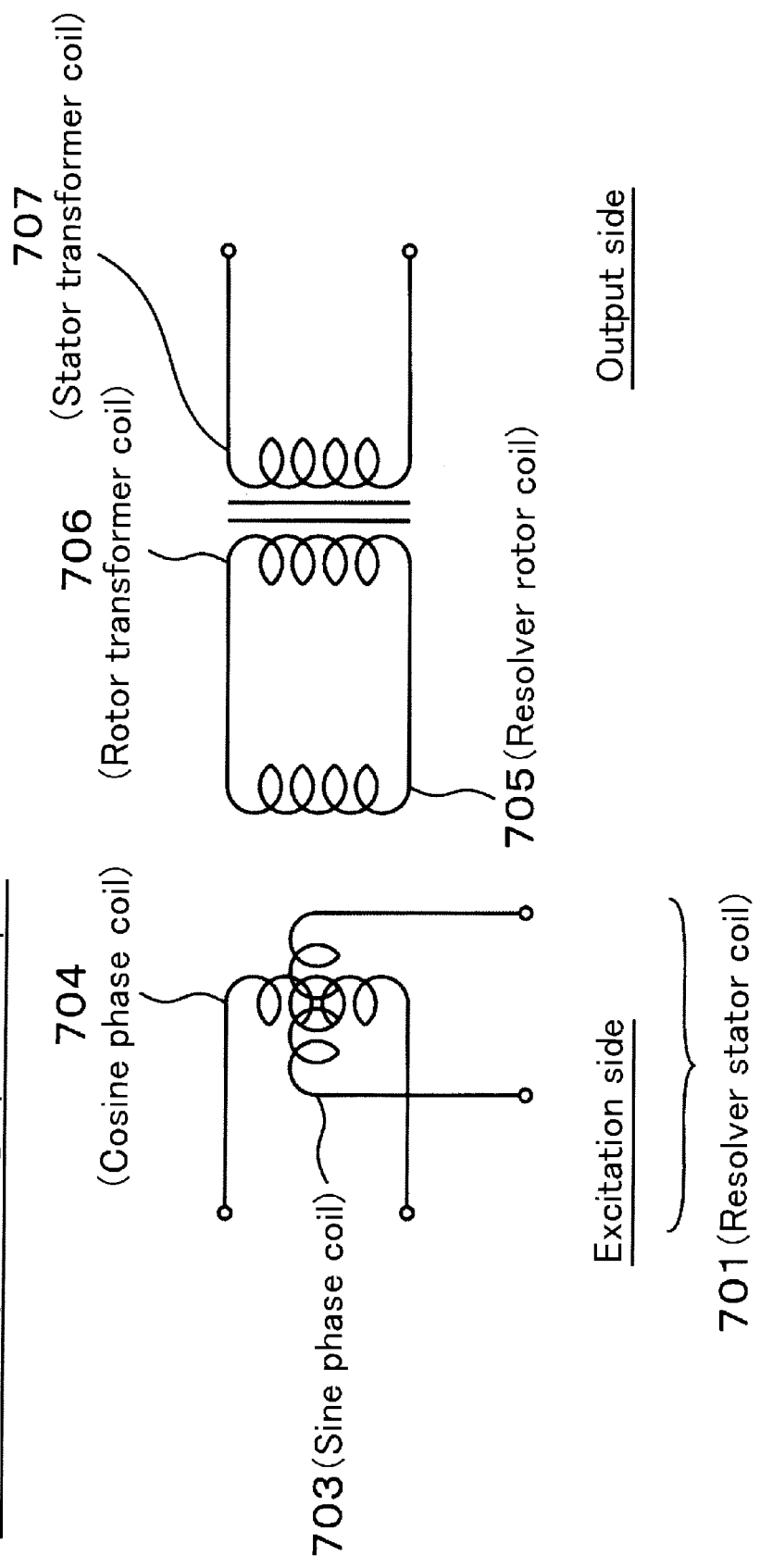
FIG. 7B is a resolver wiring diagram of a two-phase input and single-phase output structure according to a second embodiment of the present invention.

The rotation angle detection operation of the sheet coil type resolver according to the first embodiment will be described with reference to FIGS. 7A and 7B schematically illustrating resolver wiring diagrams showing relations between coils. The first and second stator transformer coils 235a and 235b (refer also to FIG. 2) are supplied with an alternating current for excitation. When an alternating current is applied to the first and second stator transformer coils 235a and 235b, a current is induced at the first and second stator coil transformer coils 235a and 235b based on the electromagnetic induction phenomenon, and the current induced is supplied to the first and second resolver rotor coils 216 and 217. By means of the induction current as excitation current, the first and second resolver rotor coils 216 and 217 generate an alternating magnetic flux, which is detected at the first and second resolver stator coils 236 and 237 based on the electromagnetic induction principle.

Based on the alternating magnetic flux generated by the first and second resolver rotor coils 216 and 217, two induction voltages are generated respectively at two coil groups (specifically, the sine phase coil group and the cosine phase coil group in the first and second resolver stator coils 236 and 237) wherein the respective phases of the two induction voltages are shifted from each other by 90 degrees. That is to say, specifically, based on the alternating magnetic flux generated by the first and second resolver rotor coils 216 and 217, an induction voltage is generated at the output coil group of sine phase, which is composed of the resolver stator coil patterns 236a, 237a, 237c, 236c, 236e, 237e, 237g, 236g, 236i, 237i, 237k, 236k, 236m, 237m, 237o and 236o, and another induction voltage, which is shifted in phase by 90 degrees from the above described induction voltage generated at the output coil group of since phase, is generated at the output coil group of cosine phase, which is composed of the resolver stator coil patterns 236b, 237b, 237d, 236d, 236f, 237f, 237h, 236h, 236j, 237j, 237l, 236l, 236n, 237n, 237p and 236p.

The phenomenon above mentioned will be described in details. For example, when an excitation signal of Vext=E sin ωt is applied to the first and second rotor transformer coils 215a and 215b, an output represented by Formula 1 below and an output represented by Formula 2 below appear, according to a rotation angle θ of the rotary shaft 101 with respect to the reference position, respectively at the output coil group of sine phase and at the output coil group of cosine phase, which are both composed of the coil patterns on the first and second resolver stator coils 236 and 237 as described above.

$$V\sin = k \cdot E \sin(n\theta) \cdot \sin(\omega t + \alpha) \qquad \text{Formula 1}$$

$$V\cos = k \cdot E \cos(n\theta) \cdot \sin(\omega t + \alpha) \qquad \text{Formula 2}$$

where k is a proportional constant, E is an excitation signal amplitude, n is an arbitrary integer of one or more, ω is an excitation signal frequency and α is a phase shift angle. Since Formula 1 and Formula 2 have a relationship of Vsin/Vcos=tan(nθ), θ can be calculated at the R/D converter based on the values of Vsin and Vcos.

The effect is verified as follows. A Comparative Example of a sheet coil type resolver was produced which incorporates a stator section structured such that a coil group of cosine phase was formed at a surface of an insulation sheet located close to a rotor section and a coil group of sine phase was formed at a surface of the insulation sheet located far from the rotor section. Variation of the sin phase output and the cosine phase output with respect to the rotation angle (rotation angle of the rotor section relative to the stator section) was measured for comparison between the Comparative Example and the sheet coil type resolver according to the present embodiment (Embodiment Example).

Figure 6A:
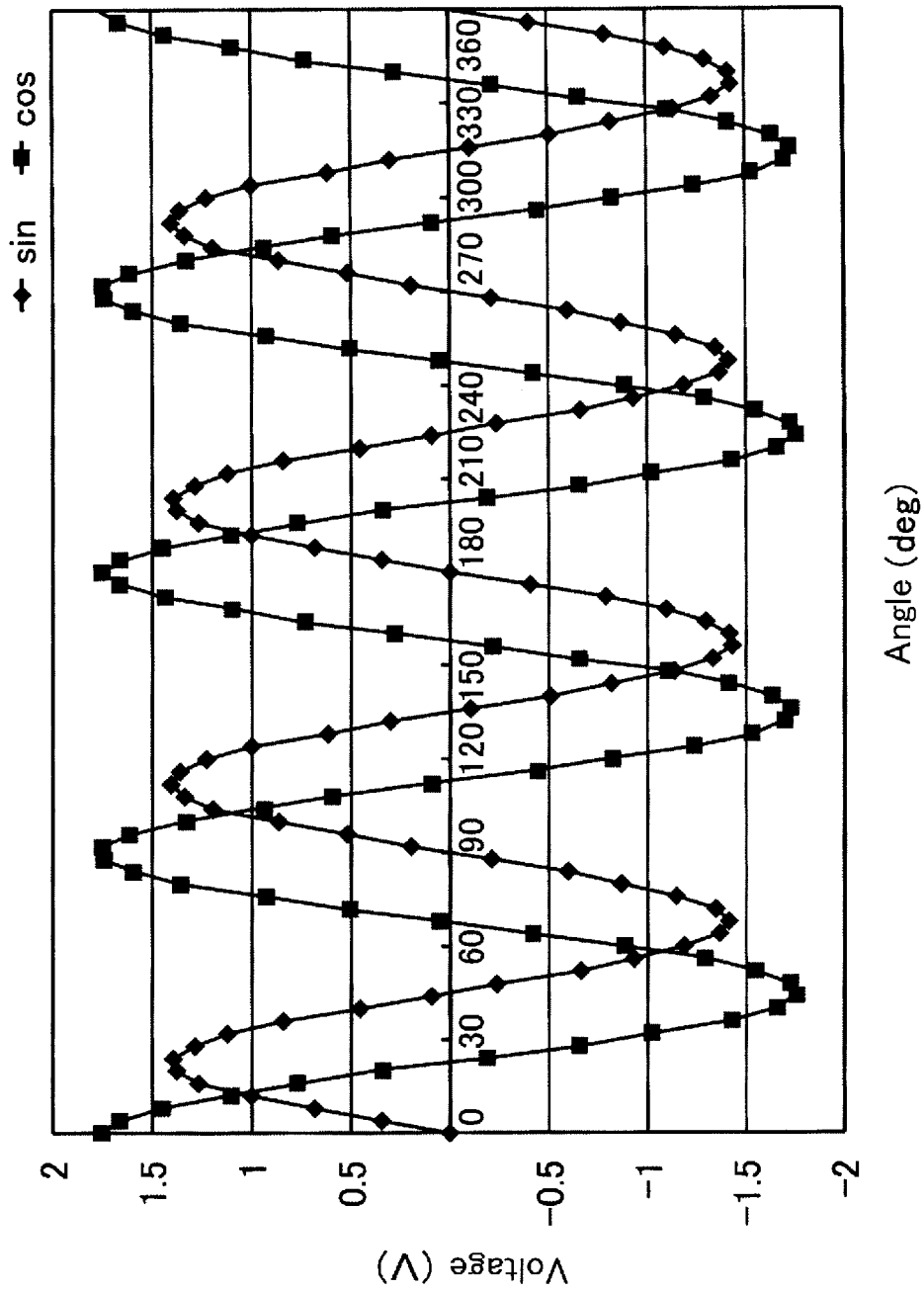

FIG. 6A is a measurement graph of output waveforms of the Comparative Example and FIG. 6B is a measurement graph of output waveforms of the Embodiment Example. In FIGS. 6A and 6B, the horizontal axis refers to a rotation angle and the vertical axis refers to a voltage value (V) of output waveform.

As clear from FIG. 6B, the output voltage peak values (amplitude values) of the sine phase output and the cosine phase output are approximate to each other in the Embodiment Example, thus rendering only a slight difference between the both peak values compared to the difference in the Comparative Example shown in FIG. 6A. The amplified difference between the sine phase output and the cosine phase output in the Comparative Example is attributed to the following facts. First, in the Comparative Example, the sine phase coil pattern and the cosine coil pattern are disposed at respective different layers and therefore the distance from the sine phase coil pattern to the excitation phase coil pattern is different from the distance from the cosine phase coil pattern to the excitation phase coil pattern.

The output of a phase whose detection coil is positioned farther from the excitation coil pattern is relatively small, because the magnetic flux density to be detected is low on the whole. Accordingly, in the Comparative Example, since the sine phase coil group is located farther from the rotor section than the cosine phase coil group, the sine phase output has a smaller amplitude than the cosine phase output. This phenomenon is clearly reflected in FIG. 6A.

On the other hand, in the Embodiment Example, the sine phase coil group and the cosine phase coil group are structured in two planes such that the same number of sine phase coil patterns and cosine phase coil patterns are disposed on each of the two planes wherein the sine phase coil pattern and the cosine phase coil pattern are arranged alternately in the circumferential direction, and therefore the average distance from the sine phase coil patterns to the excitation phase coil pattern is equal to the average distance from the cosine phase coil patterns to the excitation phase coil pattern. Consequently, the peak value of the magnetic flux density to be detected by the sine phase coil group is equal to the peak value of the magnetic flux density to be detected by the cosine phase coil group (though their respective phases are shifted by 90 degrees from each other). Thus, the variation in output voltage between at the cosine phase coil group and at the sine phase coil group is minimized (or eliminated), which results in a minimized difference in output voltage therebetween as shown in FIG. 6B.

In a resolver, rotation angle information is calculated at the R/D converter according to the phase difference between the sine phase output voltage and the cosine phase output voltage. In this connection, if the sine phase output voltage has a waveform size (amplitude value) different from that of the cosine phase output voltage, the phase difference information does not precisely reflect the rotation angle, and the error increases in the angle information detected. Accordingly, the output waveform shown in FIG. 6B is more preferable than the output waveform shown in FIG. 6A.

In the sheet coil type resolver 200 according to the present embodiment, the first resolver stator coil 236 is structured such that the plurality of resolver stator coil patterns 236a to 236p having a planar shape are disposed circumferentially on one same plane, and the second resolver rotor coil 217 is disposed to axially oppose the first resolver stator coil 316 with a distance therebetween. In the first resolver stator coil 236, two coil groups having respective phases (sine and cosine phases) and having a phase difference of 90 degrees in electrical angle are constituted by the plurality of resolver stator coil patterns 236a to 236p.

In the structure described above, the two coil groups having respective phases and having a phase difference of 90 degrees from each other are formed on one same plane. Accordingly, the distance from one coil group at the stator section to the coil at the rotor section is equal to the distance from the other coil group at the stator section to the coil at the rotor section.

Specifically, when the resolver rotor coil pattern 216a (refer to FIG. 4A) overlap axially with the resolver stator coil patterns 236a and 236b (refer to FIG. 5A), a distance (defined as L1) from the resolver rotor coil pattern 216a to the resolver stator coil pattern 236a as the sine phase output coil is equal to a distance (defined as L2) from the resolver rotor coil pattern 216a to the resolver stator coil pattern 236b as the cosine phase output coil (L1=L2).

The structure described above contributes to minimizing or even eliminating the variation of the magnetic flux density to be detected, which is caused due to the difference between the distance L1 and the distance L2. This results in minimizing or even eliminating the variation in output (amplitude variation) between at the sine phase and at the cosine phase, thus equalizing the output levels at the two phases, whereby the theoretical precision of Formulas 1 and 2 is enhanced and therefore the angle detection precision in the sheet coil type resolver can be improved.

In the present embodiment, each of the resolver stator coil patterns 236a, 236c, 236e, 236g, 236i, 236k, 236m and 236o included in the first phase (sine phase) and each of the resolver stator coil patterns 236b, 236d, 236f, 236h, 236j, 236l, 236n and 236p included in the second phase (cosine phase) are arranged alternately in the circumferential direction.

In the structure described above, outputs having a phase difference of an electrical angle of 90 degrees from each other can be achieved with a high precision due to its simple coil design and also its layout. Accordingly, the angle detection precision can be enhanced.

The first resolver rotor coil 216 is composed of the plurality of resolver rotor coil patterns 216a to 216h having a planar shape and each having an area size corresponding to the aggregate area size of two adjacent coil patterns of the resolver stator coil patterns 236a to 236p. The resolver rotor coil patterns 216a to 216h are arranged circumferentially and connected to one another in series thereby constituting a coil group of one phase.

According to the above arrangement, since the area size of one excitation coil corresponds to the aggregate area size of two detection coils, the output waveform symmetry between the sine phase and the cosine phase can be improved. This further enhances the angle detection precision.

The two-layer structure constituted by the first and second resolver stator coils 236 and 237 functions as the resolver stator coil, wherein the resolver stator coil patterns 236a to 236p to constitute the first resolver stator coil 236 and the resolver stator coil patterns 237a to 237p to constitute the second resolver stator coil 237 are connected to each other via the through-hole (for example, the through-hole 240 in FIG. 5C) adapted to electrically connect therebetween, and wherein the same number of coil patterns for the sine phase coil group and the cosine phase coil group are disposed at each of the two layers in which the fist and second resolver stator coils 236 and 237 are formed respectively.

According to the above arrangement, the average distance from the sine phase coil group functioning as the detection coil to the excitation coil and the average distance from the cosine phase coil group functioning as the detection coil to the excitation coil can be equalized with each other. Thus, the structure can be obtained in which due to the multi-layered detection coil, a large detection output can be produced and at the same time the difference in output between the sine phase and the cosine phase can be eliminated, whereby a high detection precision can be achieved.

On the other hand, the two-layer structure constituted by the first and second resolver rotor coils 216 and 217 functions as the resolver rotor coil, wherein the resolver rotor coil patterns 216a to 216h to constitute the first resolver rotor coil 216 and the resolver rotor coil patterns 217a to 217h to constitute the second resolver rotor coil 217 are connected to each other via the through-hole (for example, the through-hole 220 in FIG. 4C) adapted to electrically connect therebetween. Due to the multi-layered structure, a stronger magnetic flux can be produced by the excitation coil, and therefore the angle detection precision can be enhanced.

A sheet coil type resolver according to a second embodiment of the present invention will now be described. In the sheet coil type resolver according to the first embodiment described so far, the resolver coil portion is of a single phase input and two phase output wiring structure as shown in FIG. 7A in which the excitation phase is a resolver rotor coil composed of a sheet coil with one phase and the detection phase is a resolver stator coil composed of a sheet coil with two phases (sine phase and cosine phase).

The present invention, however, is not limited to the structure described above, and a sheet coil type resolver may alternatively include a resolver coil portion of a two phase input and single output wiring structure as shown in FIG. 7B which includes an excitation phase constituted by a resolver stator coil composed of a sheet coil with two phases (sine phase and cosine phase) and a detection phase constituted by a resolver rotor coil composed of a sheet coil with one phase.

Referring to FIG. 7B, the sheet coil type resolver according to the second embodiment includes a resolver stator coil 701 (with a sine phase coil 703 and a cosine phase coil 704) and a resolver rotor coil 705, wherein the resolver stator coil 701 functions as an excitation coil and the resolver rotor coil 705 functions as a detection coil.

Specifically, while the stator section in the second embodiment is structured the same as the stator section 202 according to the first embodiment, a sine phase excitation signal is applied to the sine phase coil group and a cosine phase excitation signal is applied to the cosine phase coil in order that the coil group of two phases functions as an excitation coil rather than as a detection coil.

Also, while the rotor section has the same structure as the rotor section 201 according to the first embodiment, a rotor transformer coil 706 functions as a detection coil, and a detection signal is received at the stator section by means of a stator transformer coil 707 and sent to an R/D converter (not shown).

In the structure described above, alternating magnetic fluxes, which have two respective phases with periodic variations different in phase by an electrical angle of 90 degrees from each other, are generated simultaneously at the stator section and a synthetic magnetic field of the alternating magnetic fluxes of two phases is detected at the rotor section. When the rotor section is rotated, the detection waveform of the magnetic field detected at the rotor section is modulated corresponding to the rotation angle, and angle information is calculated at the R/D converter according to the modulation state.

The sheet coil type resolvers according to the first and second embodiments have an axial multiple angle of 4X, but the present invention is not limited to such an axial multiple angle arrangement and a sheet coil type resolver, as a variation of the embodiments, may alternatively be provided with an axial multiple angle of any arbitrary number. In this connection, the basic structure is the same as in the first embodiment, specifically the coil patterns of two phases in the resolver stator coil portion different in phase by en electrical angle of 90 degrees from each other are arranged alternately in the circumferential direction and the coil patterns of one same phase are connected to one another in series, wherein the coil patterns are arranged circumferentially such that two adjacent coil patterns are shifted from each other by a mechanical angle of (90/(m×n)) degrees (n is an axial multiple angle number, and m is an arbitrary integer of one or more) for the axial multiple angle nX of the resolver (n is an arbitrary integer of one or more).

A sheet coil type resolver according to a third embodiment of the present invention will be described. In the sheet coil type resolver according to the first embodiment described above, a resolver coil portion is composed of a resolver rotor coil portion and a resolver stator coil portion which both have a two-layer pattern structure, but the present invention is not limited to such a structure, and a three or more-layer pattern structure or a single layer pattern structure may be possible. A description will follow about a sheet coil type resolver of an axial multiple angle 4X in which a resolver rotor coil portion and a resolver stator coil portion both have a single layer coil pattern.

Figure 8A:
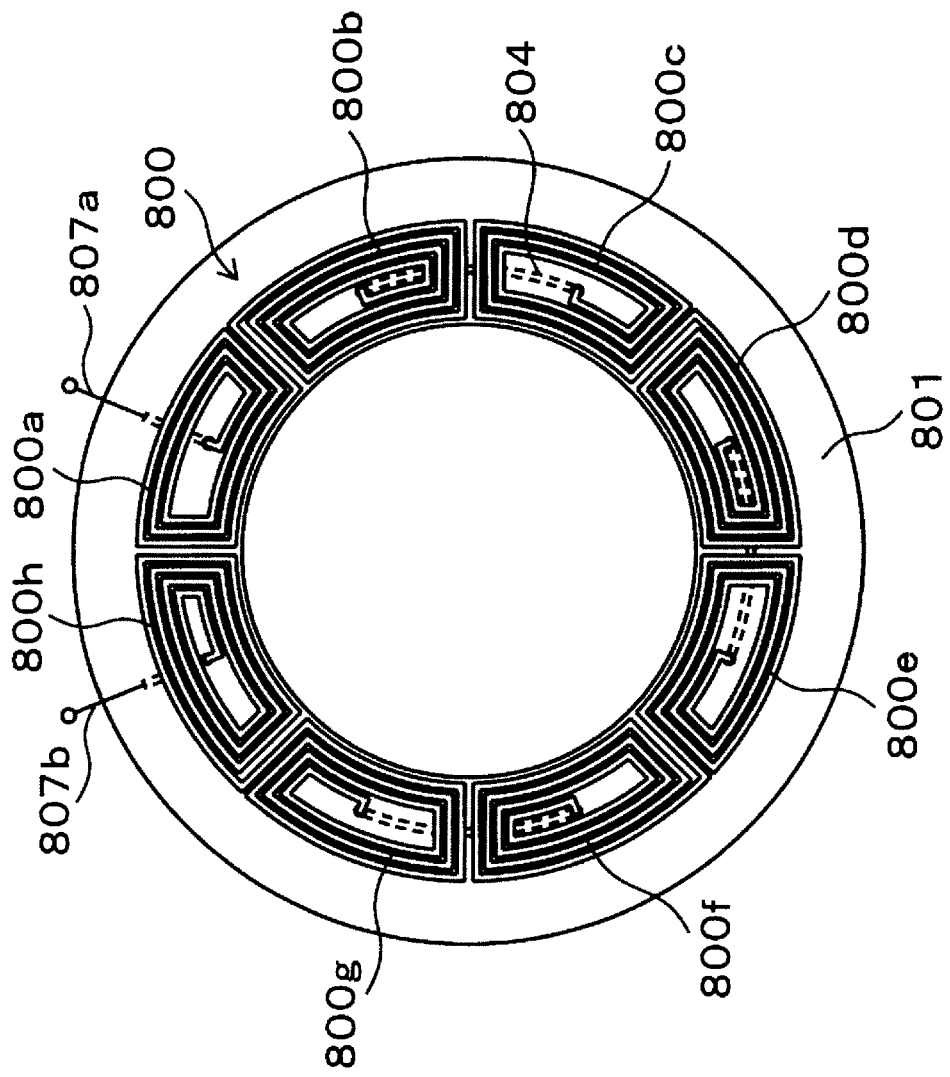
FIGS. 8A and 8B are schematic plan views of respective coil pattern structures of a single-layer structured resolver rotor coil unit and a single-layer structured resolver stator coil unit according to a third embodiment of the present invention.
Figure 8B:
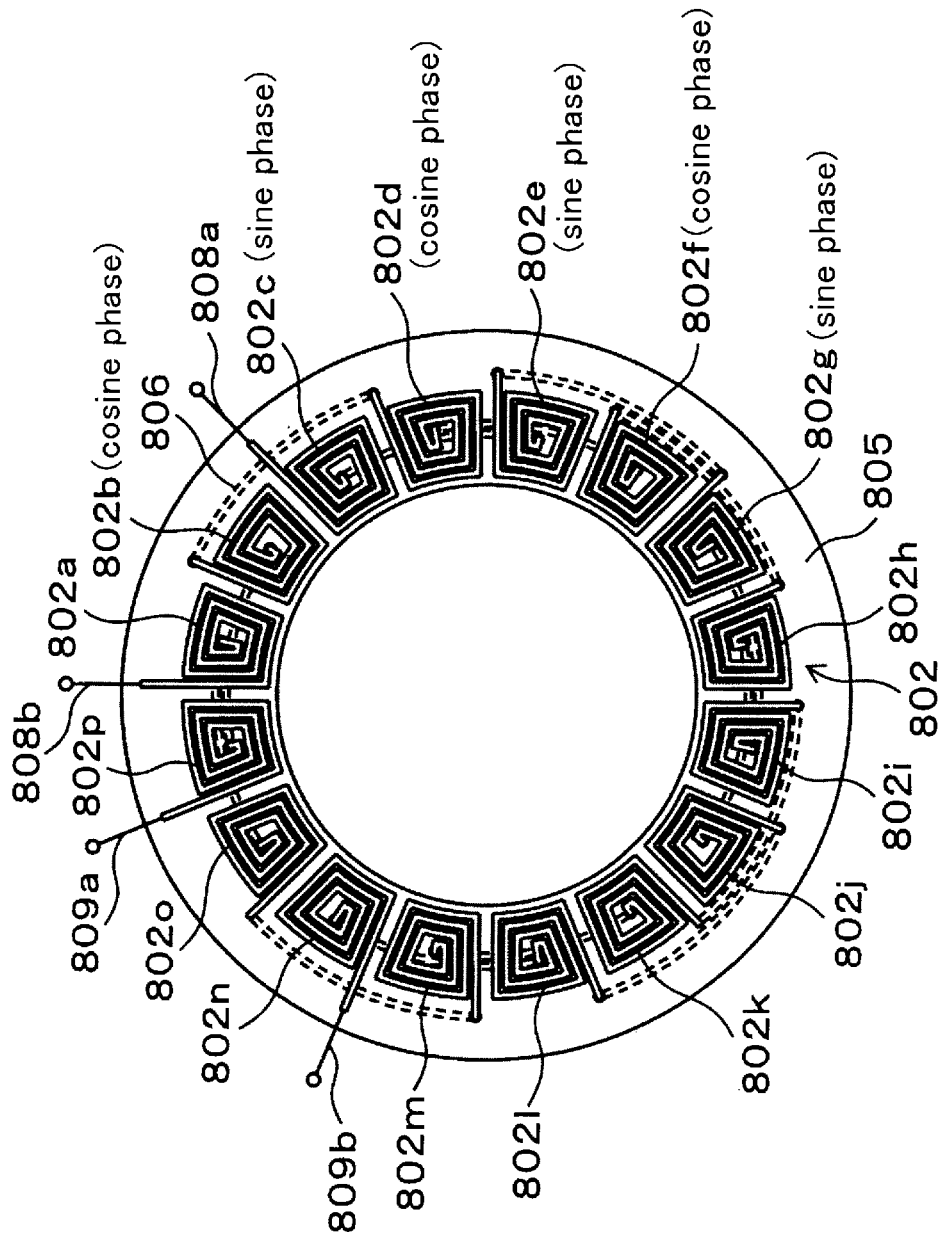

FIGS. 8A and 8B respectively show a resolver rotor coil portion and a resolver stator coil portion both having a single layer coil pattern structure.

Referring to FIG. 8A, the rotor section includes an insulation sheet 801 and a resolver rotor coil 800 formed at one surface of the insulation sheet 801. The resolver rotor coil 800 includes eight resolver rotor coil patterns 800*a* to 800*h* connected in series to one another.

The resolver rotor coil patterns 800*a* to 800*h* are arranged circumferentially and equiangularly such that two adjacent coil patterns are shifted from each other by a mechanical angle of 45 degrees, wherein the coil patterns are connected in series to one another whereby two adjacent coil patterns produce respective magnetic fluxes directed opposite to each other. In order to enable the series connection structure described above, a crossover wiring pattern 804 as shown typically is provided at a back side surface of the insulation sheet 801. Other parts of the rotor section are structured the same as in the first embodiment.

Referring to FIG. 8B, the stator section includes an insulation sheet 805 and a resolver stator coil 802 formed at one surface of the insulation sheet 805. The resolver stator coil 802 includes sixteen resolver stator coil patterns 802*a* to 802*p* which are arranged circumferentially and equiangularly at a mechanical angle of 22.5 degrees.

Of the resolver stator coil patterns 802*a* to 802*p*, the resolver stator coil patterns 802*c*, 802*e*, 802*g*, 802*i*, 802*k*, 802*m*, 802*o* and 802*a* constitute a sine phase detection coil group, and the resolver stator coil patterns 802*p*, 802*b*, 802*d*, 802*f*, 802*h*, 802*j*, 802*l* and 802*n* constitute a cosine phase detection coil group.

The resolver stator coil patterns 802*c*, 802*e*, 802*g*, 802*i*, 802*k*, 802*m*, 802*o* and 802*a* of the sine phase detection coil group are circumferentially connected in series to one another so that two sine phase resolver stator coil patterns sandwiching therebetween one cosine phase resolver stator coil pattern have respective phases opposite to each other. In order to enable the series connection, a crossover wiring pattern 806 as shown typically is provided at a back side surface the insulation sheet 805. This connection structure applies also to the resolver stator coil patterns 802*p*, 802*b*, 802*d*, 802*f*, 802*h*, 802*j*, 802*l* and 802*n* of the cosine detection coil group. Other parts of the stator section are structured the same as in the first embodiment.

The sheet coil type resolver according to the fourth embodiment is caused to operate by excitation current applied to lead wires 807*a* and 807*b* of the resolver rotor coil. A sine phase output is obtained from sine phase lead wires 808*a* and 808*b*, and a cosine phase output is obtained from cosine phase lead wires 809*a* and 809*b*. The detailed operation of the sheet coil type resolver of the third embodiment is the same as that of the first embodiment.

The sheet coil type resolver according to the third embodiment is comparable to the sheet coil type resolver according to the first embodiment, in that the difference in output between at the sine phase and at the cosine phase is small. Also, the resolver rotor coil portion can share a wiring layer with the rotor transformer coil portion disposed radially inside the resolver rotor coil portion, and moreover the resolver stator coil portion can share a wiring layer with the stator transformer coil portion disposed radially inside the resolver stator coil portion.

Figure 9:
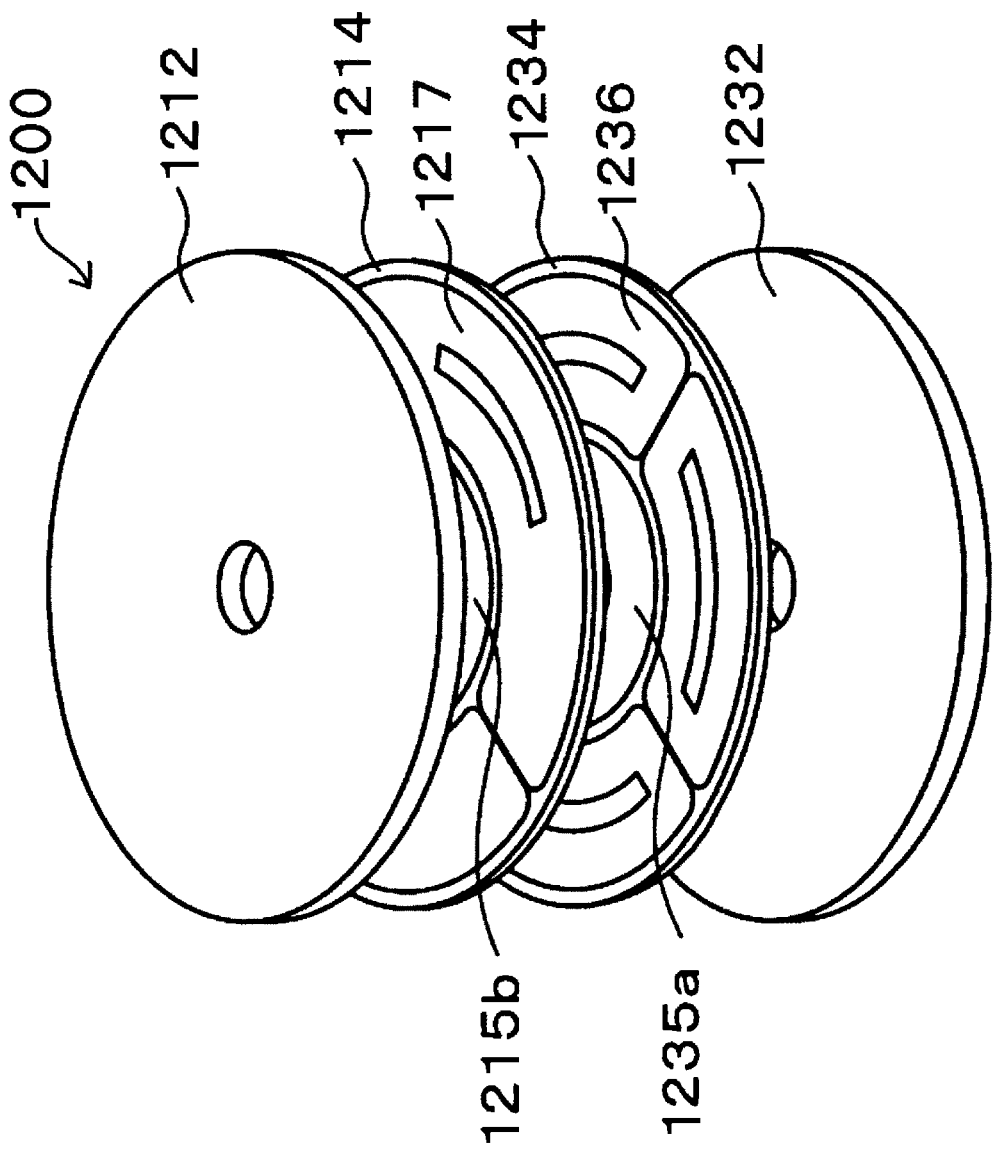
FIG. 9 is an exploded perspective view of a relevant portion of a sheet coil type resolver according to a fourth embodiment of the present invention.
Figure 10:
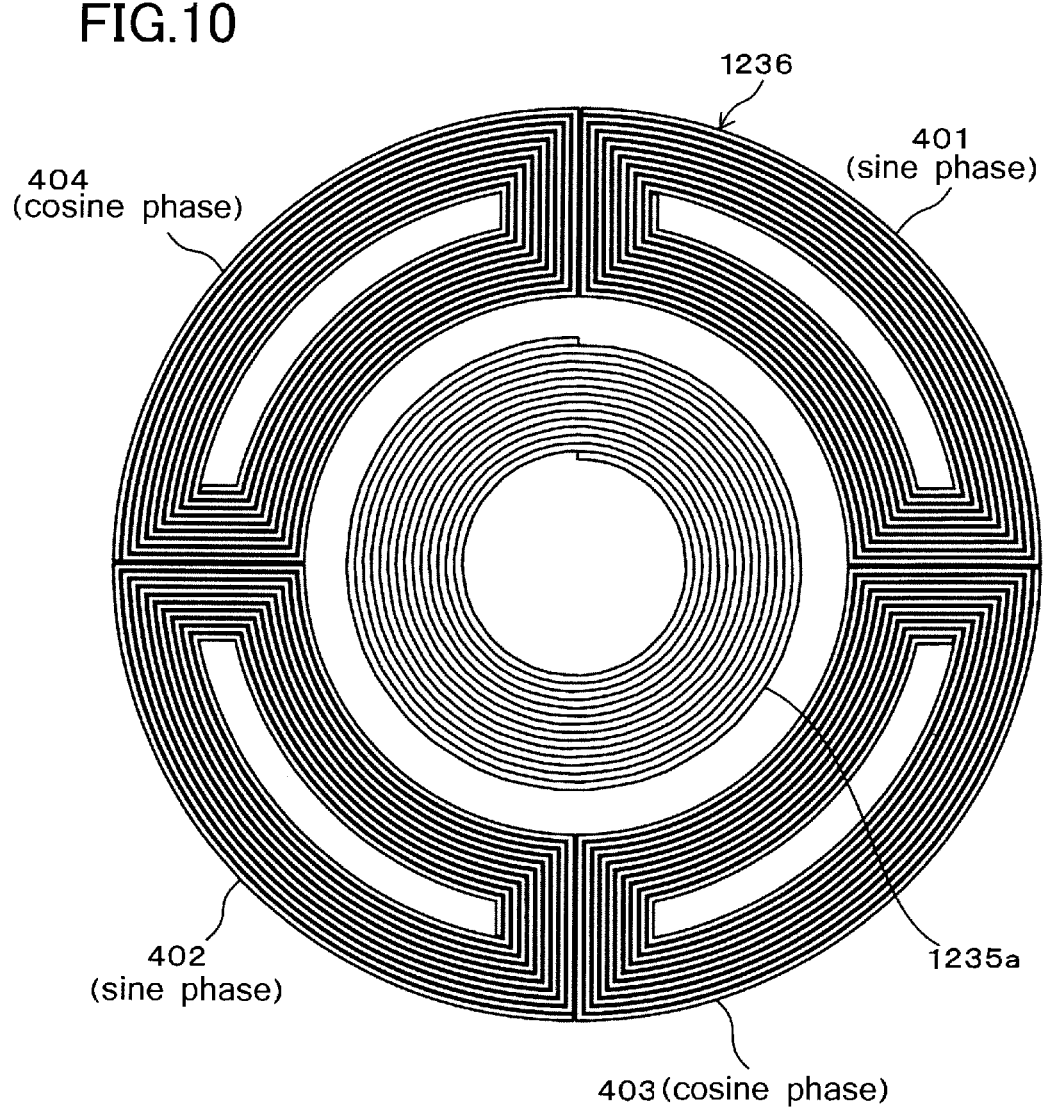
FIG. 10 is a plan view of a detection coil and a transformer coil disposed at a stator section according to the fourth embodiment viewed from the axial direction.

A sheet coil type resolver 1200 according to a fourth embodiment of the present invention will be described wherein description will be focused on the difference from the preceding embodiments. Referring to FIGS. 9 and 10, the sheet coil type resolver 1200 according to the fourth embodiment includes, at its stator section (1202), a first resolver stator coil 1236 including sine phase detection coil patterns 401 and 402 and cosine phase detection coil patterns 403 and 404. A first stator transformer coil 1235*a* is disposed radially inside the first resolver stator coil 1236.

Though not illustrated, two sine phase detection coil patterns which are structured similarly as above and constitute a second resolver stator coil (1237) (not shown, refer to FIG. 2 explaining the first embodiment) are disposed and located to axially overlap with the sine phase detection coil patterns 401 and 402 of the first resolver stator coil 1236. The two sine phase detection coil patterns are series connected respectively to the sine phase detection coil patterns 401 and 402 which overlap axially therewith.

Likewise, though not illustrated, two cosine phase detection coil patterns which are structured similarly as above and constitute a second resolver stator coil (1237) (not shown, refer to FIG. 2 explaining the first embodiment) are disposed and located to axially overlap with the cosine phase detection coil patterns 403 and 404 of the first resolver stator coil 1236. The two cosine phase detection coil patterns are series connected respectively to the cosine phase detection coil patterns 403 and 404 which overlap axially therewith.

The rotation angle detection operation of the sheet coil type resolver 1200 according to the fourth embodiment will be described. When the rotary shaft 101 of the motor 100 is rotated, a rotor section (1201) is caused to rotate with respect to the stator section (1202), and the effect caused by the rotation of the rotor section (1201) is reflected in the sine and cosine phase output components which are induced in the detection coil groups of respective phases. For example, when an excitation signal of Vext=E sin ωt is applied to first and second rotor transformer coils (1215*a*) and 1215*b*, outputs represented by Formulas 1 and 2 mentioned earlier (refer to paragraphs [0089] and [0090]) appear, according to the rotation angle θ of the rotary shaft 101 with respect to the reference position, respectively at the output coil group of sine phase and at the output coil group of cosine phase, which are both composed of the coil patterns on the first and second resolver stator coils 1236 and (1237) as described above.

Since Formula 1 and Formula 2 have a relationship of Vsin/Vcos=tan(nθ), θ can be calculated at the R/D converter based on the values of Vsin and Vcos.

Figure 11:
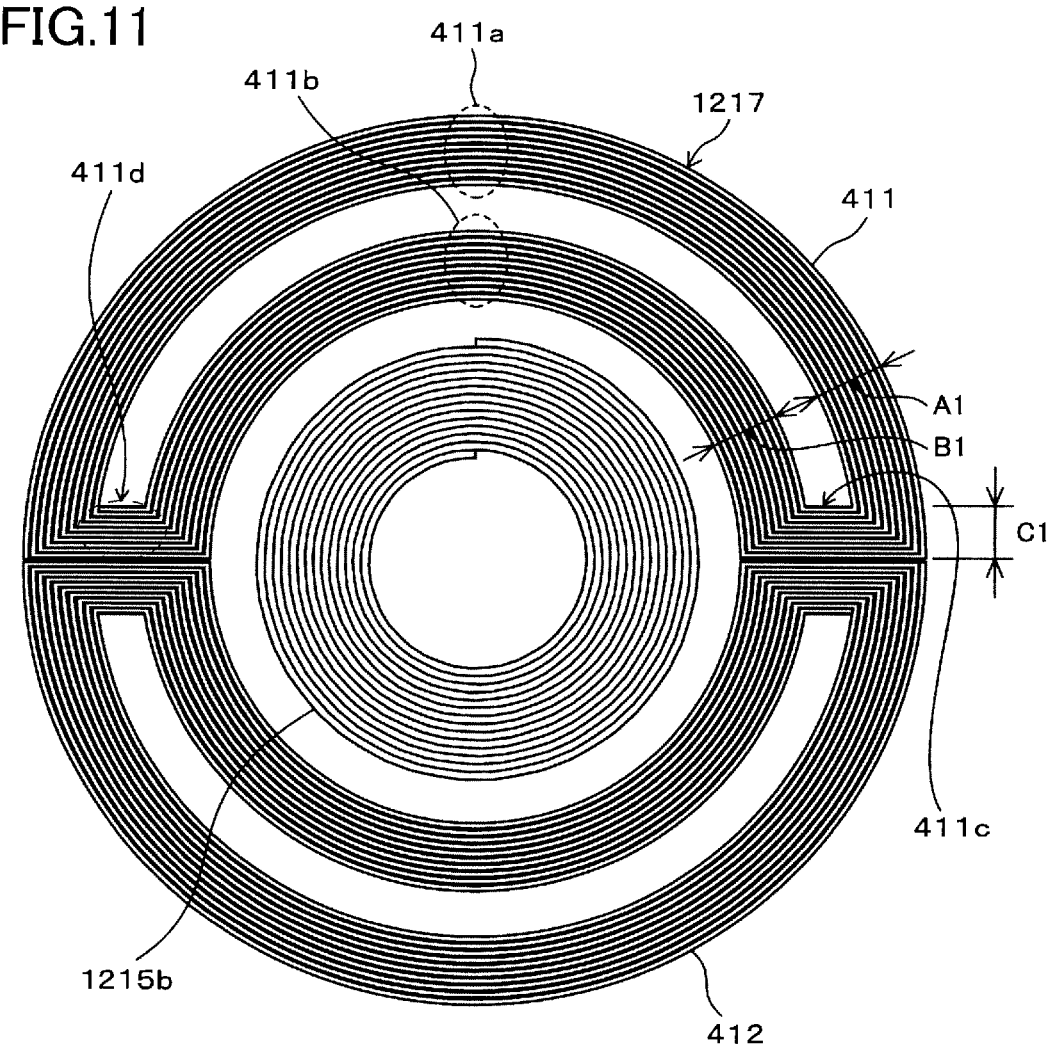
FIG. 11 is a plan view of an excitation coil and a transformer coil disposed at a rotor section on a Comparative Example viewed from the axial direction.

Description will be made of a Comparative Example as a conventional art with reference to FIG. 11 which shows a coil pattern structure where a conventional excitation coil is used experimentally in the rotor section (1202) of the sheet coil type resolver 1200 according to the fourth embodiment described above. Referring to FIG. 11, the Comparative Example includes a second resolver rotor coil 1217 which is constituted by two excitation coils 411 and 412, and the second rotor transformer coil 1215*b* is disposed radially inside the second resolver rotor coil 1217.

Though not illustrated, another two excitation coils which have the same coil pattern and which constitute a first resolver rotor coil (1216) (not shown) are disposed and located to axially overlap respectively with the excitation coils 411 and 412. The another two excitation coils are series connected respectively to the excitation coils 411 and 412 axially overlapping therewith.

The excitation coil 411 has a rectangular spiral shape curved circumferentially and includes an outer circumferential pattern portion 411*a* and an inner circumferential pattern portion 411*b*, wherein the outer circumferential pattern portion 411*a* and the inner circumferential pattern portion 411*b* are connected to each other at two parts (both circumferential ends) thereof via turn-back pattern portions 411*c* and 411*d*. The excitation coil 412 has the same structure as the excitation coil 411, but with an upside-down orientation.

Referring to FIG. 11, there is a relationship of: A1≈B1≈C1 where A1 is a width (entire width) of the outer circumferential pattern portion 411*a*, B1 is a width (entire width) of the inner circumferential pattern portion 411*b*, and C1 is a width (entire width) of the turn-back coil pattern portion 411*c*/411*d*. That is to say, the excitation coil 411 has substantially the same width (entire width) throughout its entire portion, which is the same for the excitation coil 412.

In the pattern structure of the excitation coils 411 and 412, the pattern is densely formed at the both circumferential ends (the turn-back pattern portions 411*c* and 411*d*) of the circumferentially curved spiral coil at which the magnetic flux varies heavily, while the magnetic flux is constant over the area between the both circumferential ends. Consequently, the voltage induced at the detection phase fails to have a sine wave distribution therefore lowering the angle detection precision.

Figure 12:
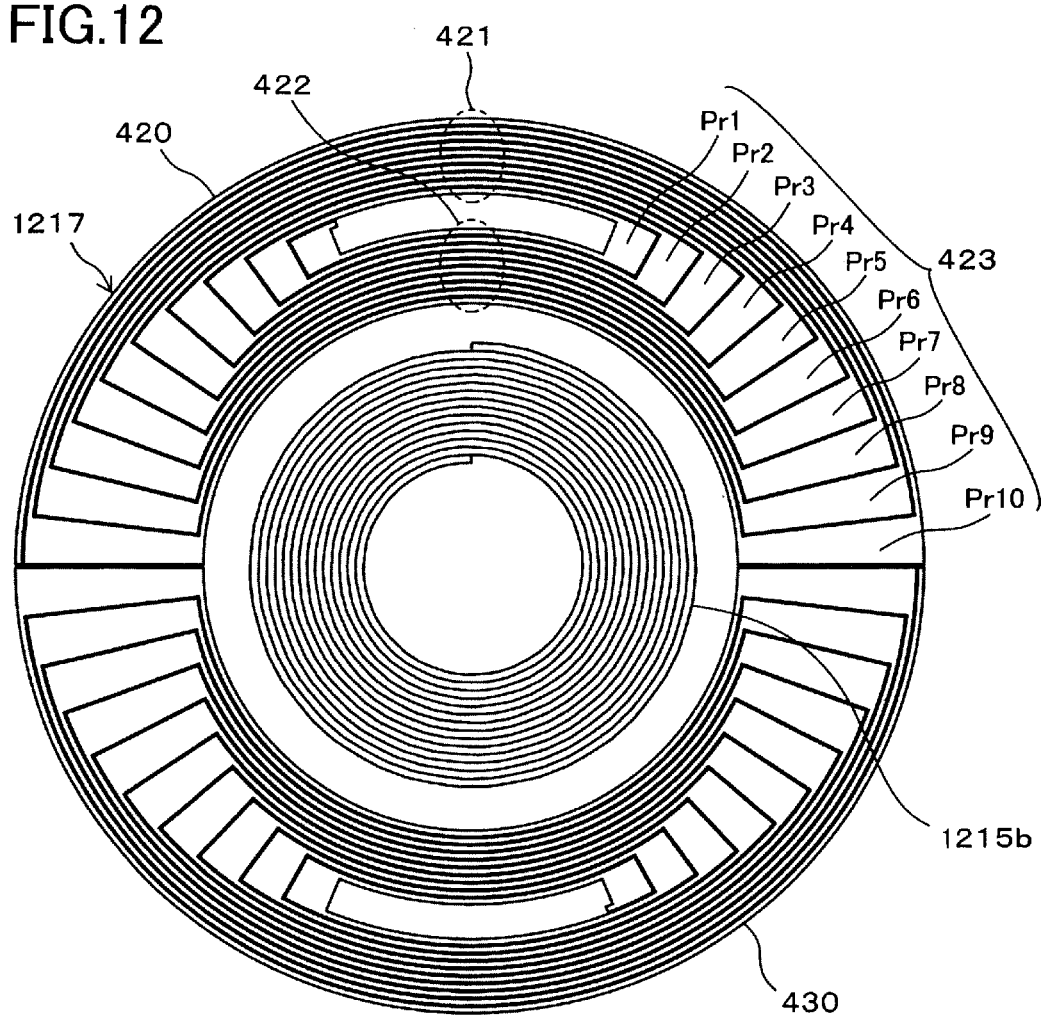
FIG. 12 is a plan view of an excitation coil and a transformer coil disposed at a rotor section on an Embodiment Example (the fourth embodiment) for explaining turn-back pattern arrangement.
Figure 13:
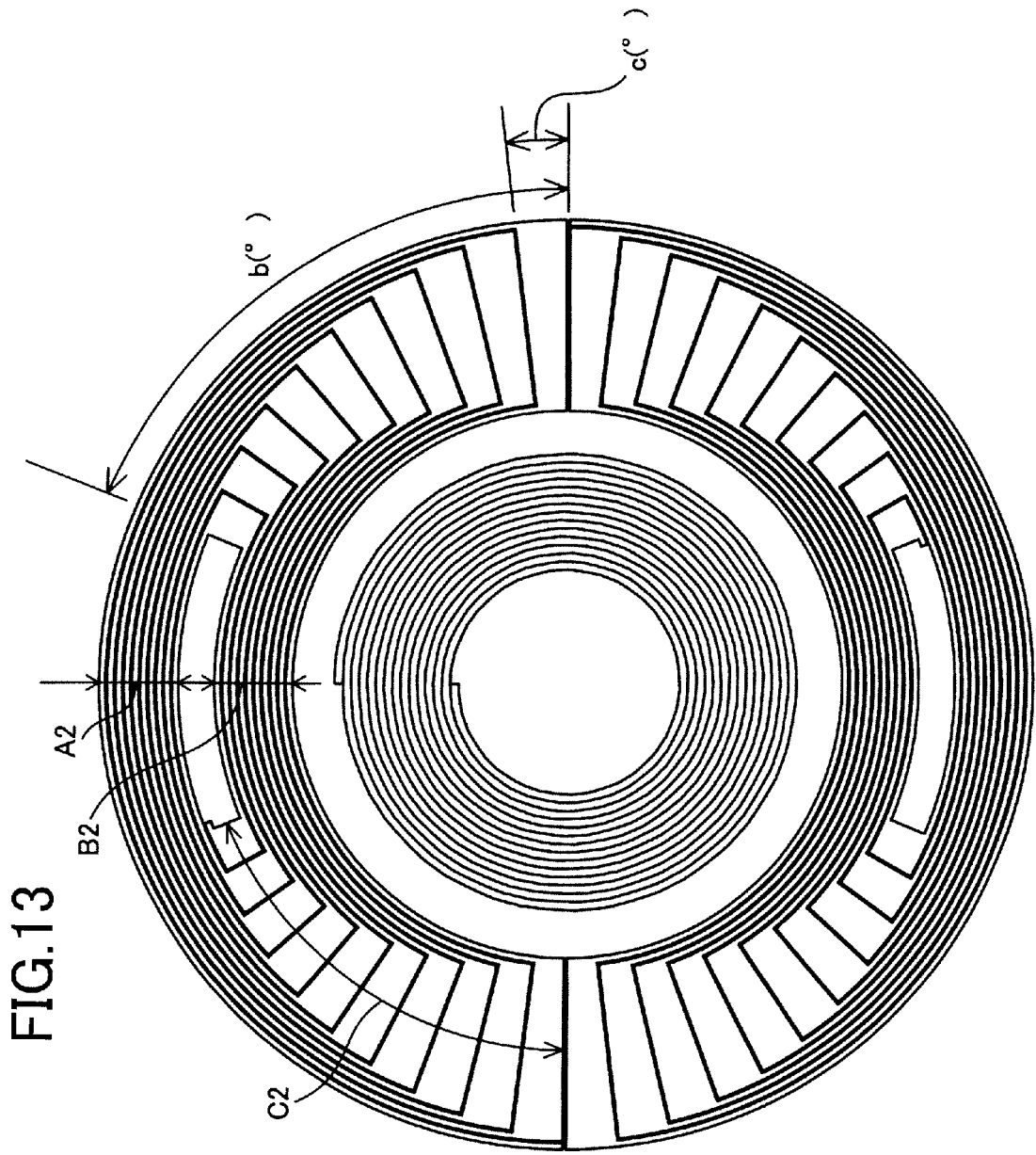
FIG. 13 a plan view of the same portion as in FIG. 12 for explaining turn-back pattern width layout.

FIGS. 12 and 13 shows a coil pattern structure at the rotor section (1202) of an Embodiment Example corresponding to the sheet coil type resolver 1200 with an axial multiple angle of 1X, wherein an example of the second resolver rotor coil 1217 shown in FIG. 9 is illustrated. The second resolver rotor coil 1217 includes excitation coils 420 and 430. Though not illustrated in FIGS. 12 and 13, another two excitation coils which have the same coil pattern structure and which constitute the first resolver rotor coil (1216) (not shown, refer to FIG. 2 for the first embodiment) are disposed and located to axially overlap with the excitation coils 420 and 430, respectively. The another two excitation coils are series connected respectively to the excitation coils 420 and 430 axially overlapping therewith.

Referring to FIG. 12, the excitation coil 420 has a rectangular spiral shape curved circumferentially and includes an outer circumferential pattern portion 421, an inner circumferential pattern portion 422 and two turn-back pattern portions 423 (only one thereof is marked with a reference number in the figure).

The turn-back pattern portion 423 includes a plurality (ten in the figure) of turn-back pattern conductors Pr1 to Pr10. The turn-back pattern conductors Pr1 to Pr10 have a larger width (circumferential direction dimensions) than the pattern conductors of the outer and inner circumferential pattern portions 421 and 422, wherein the layout of the turn-back pattern portion 423 is adjusted and arranged according to the pattern conductor width.

Description will be made of the width of the turn-back pattern conductors Pr1 to Pr10. Referring to FIG. 13, in terms of angle, the width of each of the turn-back pattern conductors Pr1 to Pr10 is assigned equally to meat: degree c (width angle of one turn-back pattern conductor)=degree b (entire width angle of the turn-back pattern portion 423)/number of pattern conductors. In this structure, there is a relationship of: A2≈B2<C2, where A2 is a width (entire width) of the outer circumferential pattern portion 421, B2 is a width (entire width) of the inner circumferential pattern portion 422, and C2 is a width (entire width) of the turn-back pattern portion 423. That is to say, the width of the turn-back patter portion 423 is larger than the width of the outer and inner circumferential pattern portions 421 and 422, which applies in the same manner to the excitation coils 430.

In the excitation coil 420, it is designed such that the turn-back pattern conductors Pr1 to Pr10 of the turn-back pattern portion 423 have a larger width than the pattern conductors of the outer and inner circumferential pattern portions 421 and 422, whereby the pattern is prevented from being densely formed at both circumferential ends of the rectangular spiral coil, and therefore the magnetic flux is prevented from varying heavily at the both circumferential ends of the rectangular spiral coil pattern thus becoming uniform over the entire area of the coil. Consequently, it is suppressed that the distribution of voltage induced at the detection phase by the rotation of the rotor section deviates from a sine wave distribution. Further, since the layout of the turn-back patterns can be individually adjusted and arranged in accordance with the shape of the coil pattern of the detection phase so that the voltage induced at the detection phase is adapted to have a sine wave distribution, a more accurate sine wave distribution can be achieved and the detection angle precision can be improved.

Specifically, the excitation coil 420 to constitute the second resolver rotor coil 1217 is structured to include the outer circumferential pattern portion 421, the inner circumferential pattern portion 422 and the turn-back pattern portions 423 which each include the turn-back pattern conductors Pr1 to Pr10 having a larger width than the other pattern portions. In this structure, the width of the turn-back pattern portion 423 is larger than the width of the outer and inner circumferential pattern portions 421 and 422, and so the magnetic flux is suppressed from varying heavily at the both coil ends. Accordingly, the distribution of the voltage induced at the detection phase comes close to a sine way distribution and the detection angle precision is enhanced.

Figure 14A:
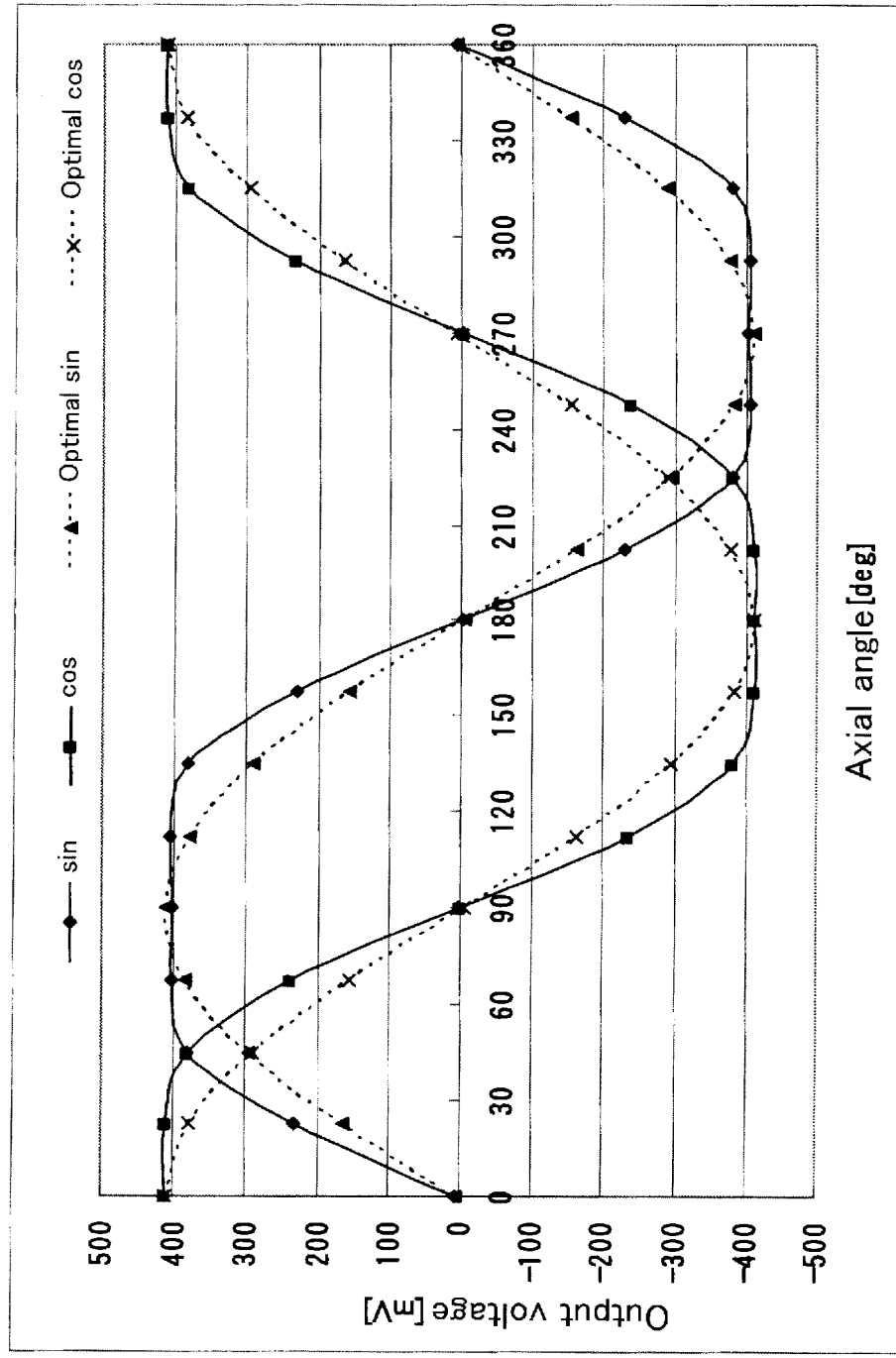
FIGS. 14A and 14B are simulation graphs of voltages induced at the detection coil at the Examples, wherein FIG. 14A refers to the Comparative Example and FIG. 14B refers to the Embodiment Example.
Figure 14B:
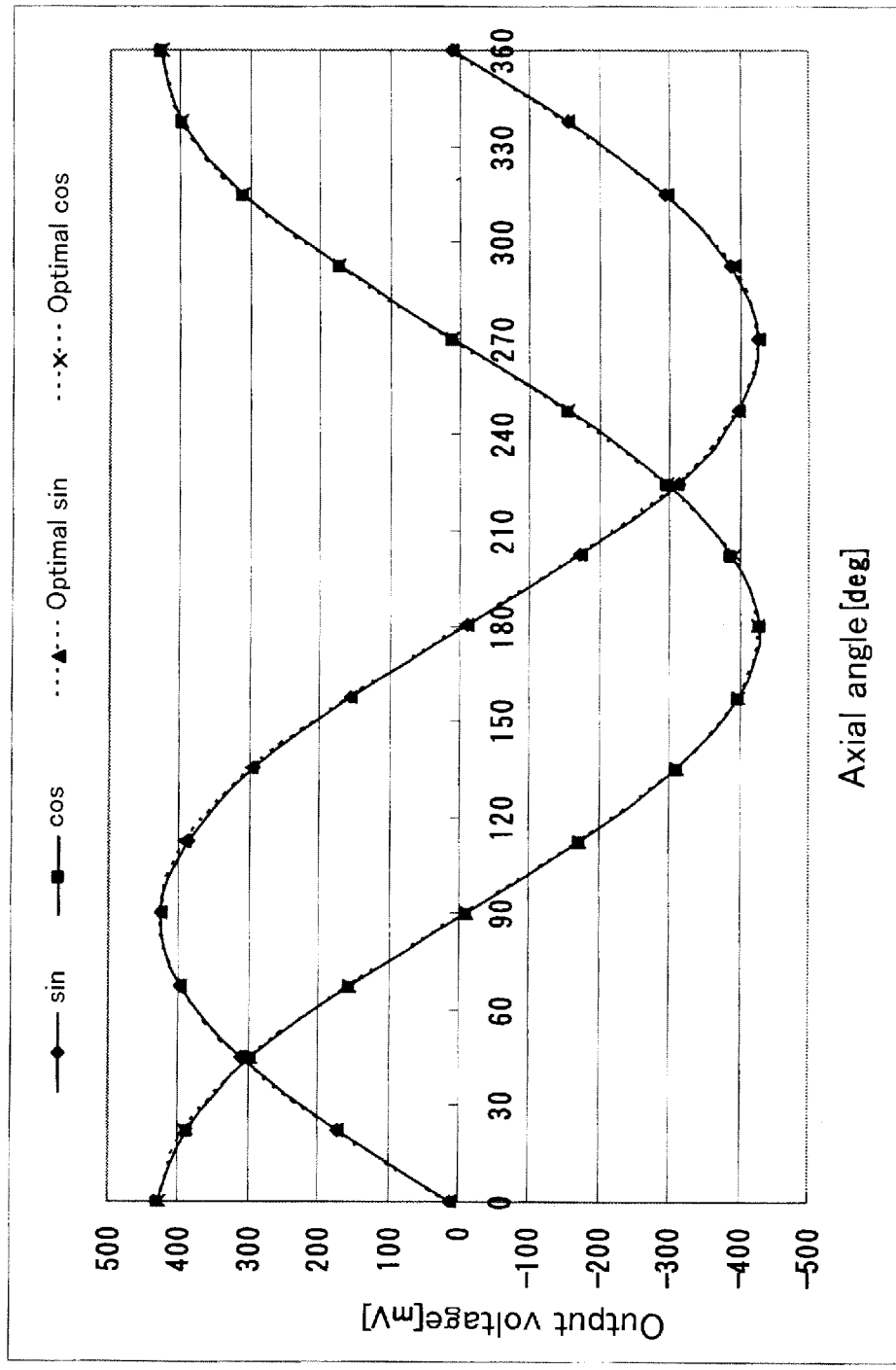

FIGS. 14A and 14B are graphs of output waveforms of the Comparative Example and the Embodiment Example, respectively, wherein FIG. 14A shows output voltage variation as a function of axis angle of a resolver on the Comparative Example incorporating the resolver rotor coil structure shown in FIG. 11, and FIG. 14B shows output voltage variation as a function of axis angle of a resolver on the Embodiment Example incorporating the resolver rotor coil structure shown in FIG. 12/13. FIGS. 14A and 14B show simulation values based on calculation using a simulator. In this connection, both the Comparative Example and the Embodiment Example incorporate the resolver stator coil structure shown in FIG. 10.

Referring to FIG. 14A, in the Comparative Example incorporating the resolver rotor coil structure shown in FIG. 11, the output voltage has a waveform deformed into a trapezoidal shape thus deviating from a sine wave distribution. On the other hand, in the Embodiment Example incorporating the resolver rotor coil structure shown in FIG. 12/13, the output voltage has a waveform nearly matching a sine wave distribution. This backs up that in the Embodiment Example, the magnetic flux is suppressed from varying heavily near the turn-back pattern portion 420 whereby the magnetic flux generated by the excitation coils 420 and 430 has a more optimal distribution.

Figure 15:
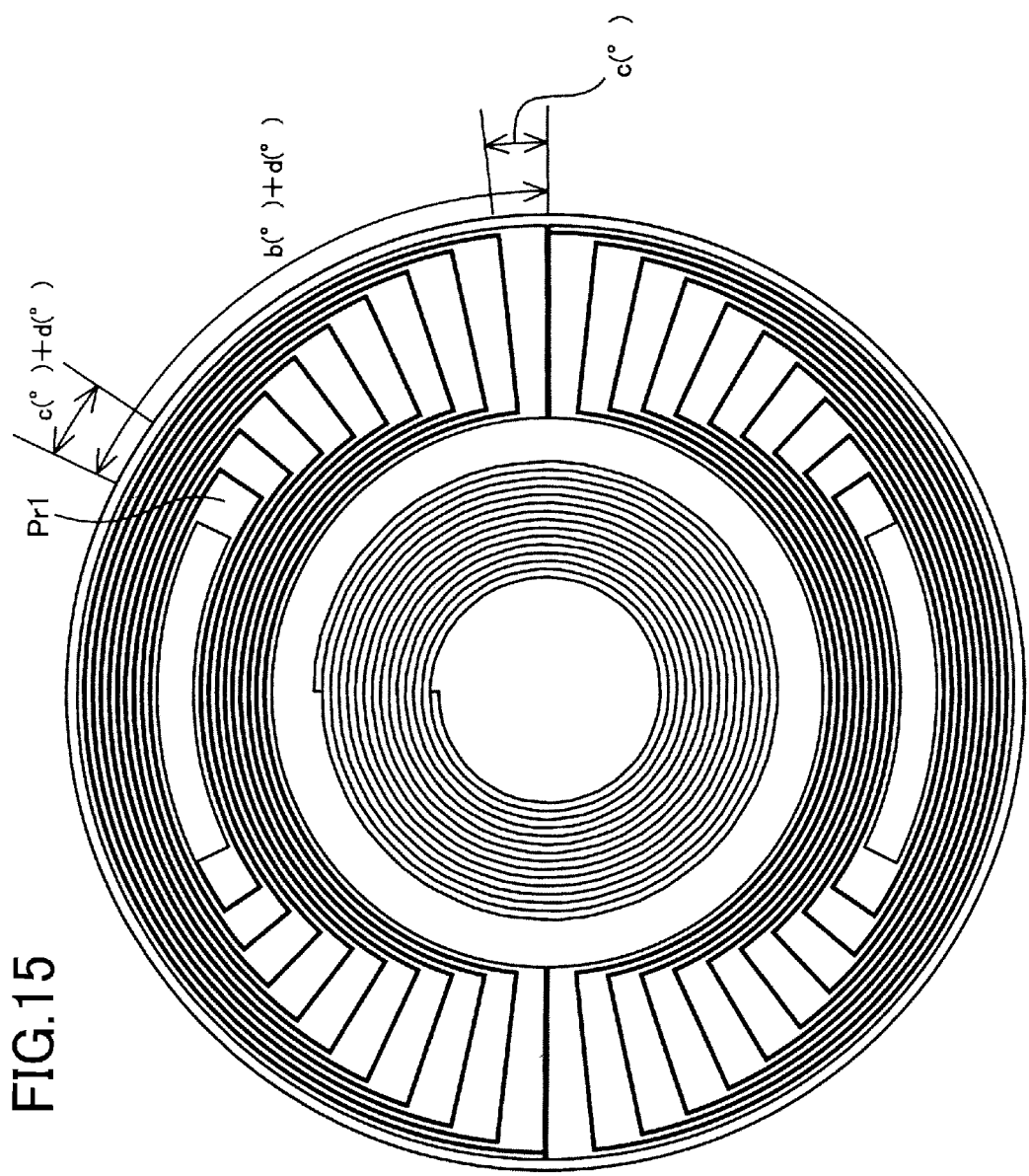
FIG. 15 is plan view of an excitation coil and a transformer coil disposed at a rotor section according to a variation of the fourth embodiment viewed from the axial direction.
Figure 16:
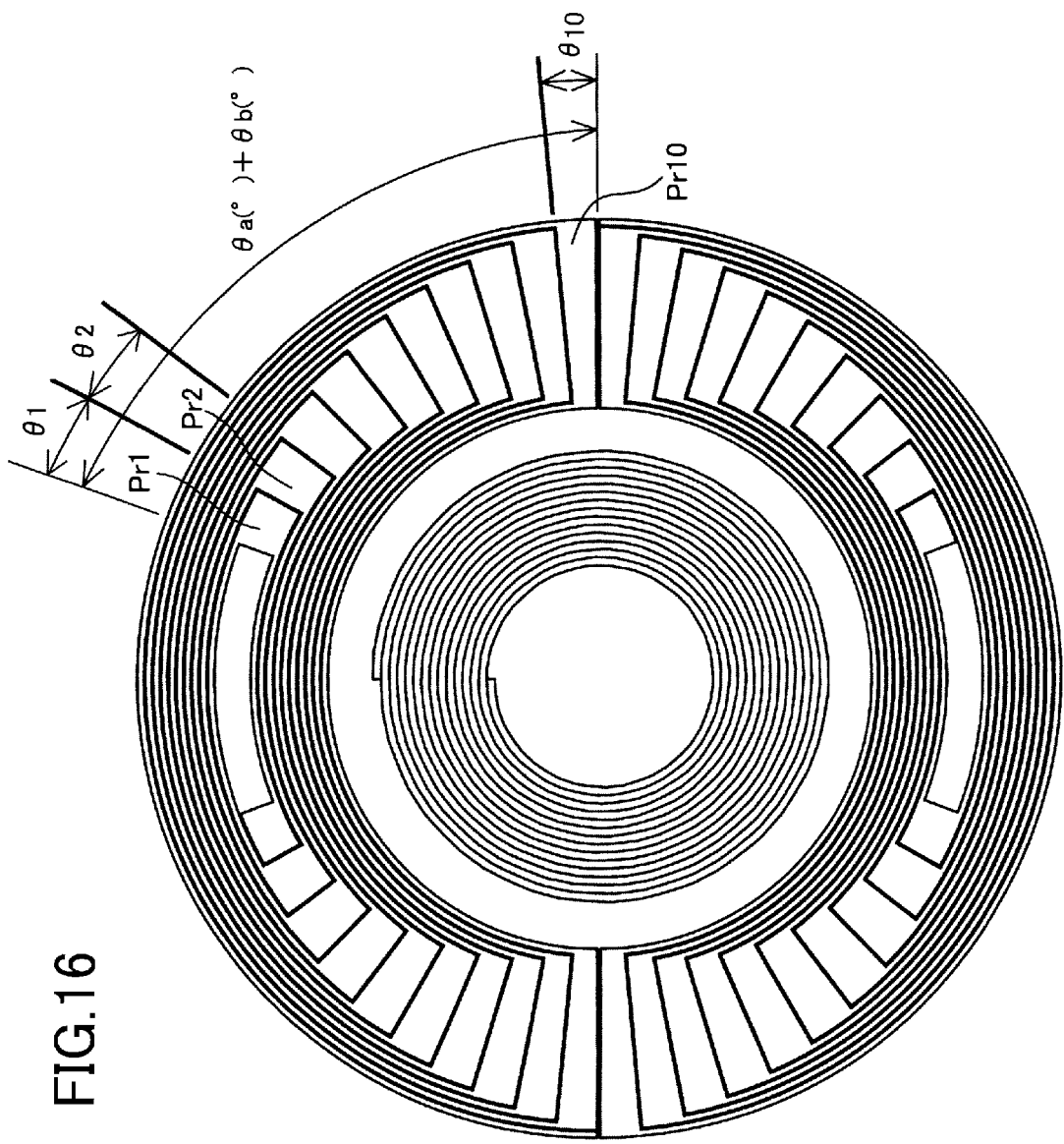
FIG. 16 is a plan view of an excitation coil and a transformer coil disposed at a rotor section according to another variation of the fourth embodiment viewed from the axial direction.

FIG. 15 shows a variation of the fourth embodiment of the present invention, where a portion (one conductor Pr10 in the figure) of the turn-back pattern conductor has a larger width (larger by d degrees in terms of angle) than all remaining turn-back pattern conductors. FIG. 16 shows another variation of the fourth embodiment, where the widths of turn-back pattern conductors Prn (n=1, 2, . . . 10) decrease sequentially in this order, in which case the angle of the turn-back pattern conductor Prn is represented by Formula 3 below.

$$\theta x = \theta a/t + (\theta b/\Sigma \times x) \quad \text{Formula 3}$$

where x is an n-th turn number, t is a number of turns, $\theta a$ is an equally assigned angle, $\theta b$ is a varying angle and $\Sigma$ is a sum from k=1 to t.

Figure 17:
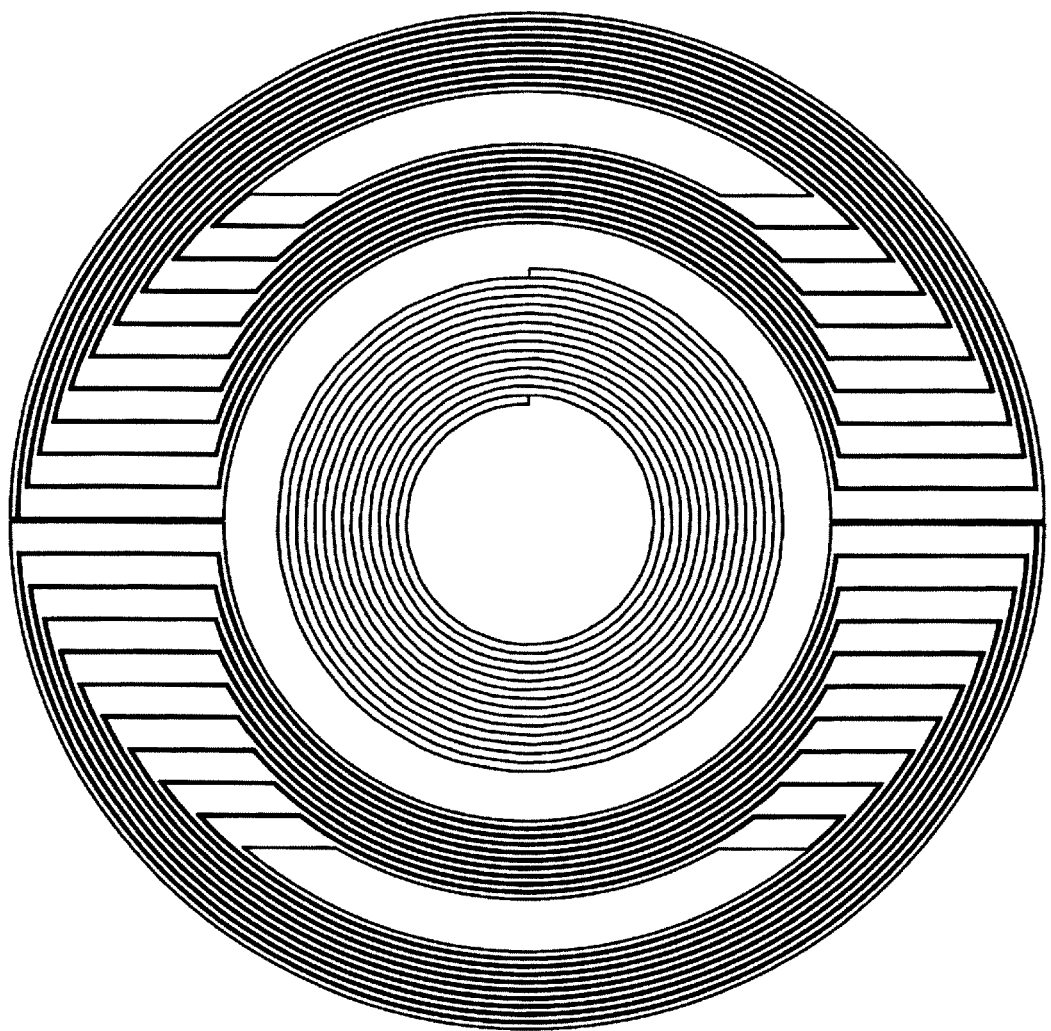
FIG. 17 is a plan view of an excitation coil and a transformer coil disposed at a rotor section according to still another variation of the fourth embodiment of the present invention viewed from the axial direction.

FIG. 17 shows still another variation of the fourth embodiment, where all turn-back pattern conductors are arranged parallel to one another in line with the outmost turn-back pattern conductor, rather than arranged equiangularly from one another. The structures shown in FIGS. 15, 16 and 17 produce the same effect as the first embodiment. The above embodiments and also the variations can be selectively applied in order to finely adjust the layout of turn-back patters in accordance with various pattern shapes in designing coil patterns of the detection phase of individual resolvers, so that the distribution of voltage induced at the detection phase has a sine wave distribution. This increases design freedom.

A sheet coil type resolver according to a fifth embodiment of the present invention will be described. In the fifth embodiment, the width of turn-back pattern conductors is the same as the width of outer and inner circumferential pattern conductors, but two adjacent pattern conductors of the turn-back pattern portions are circumferentially spaced apart from each other at a distance larger than a distance between two adjacent pattern conductors of the outer and inner circumferential pattern portions, in which case the width (entire width) of the turn-back pattern portion is larger than the width (entire width) of the outer and inner circumferential pattern portions (that is to say, the entire pattern width of the turn-back pattern portion is increased because of the increased distance between two adjacent turn-back pattern conductors).

Figure 18:
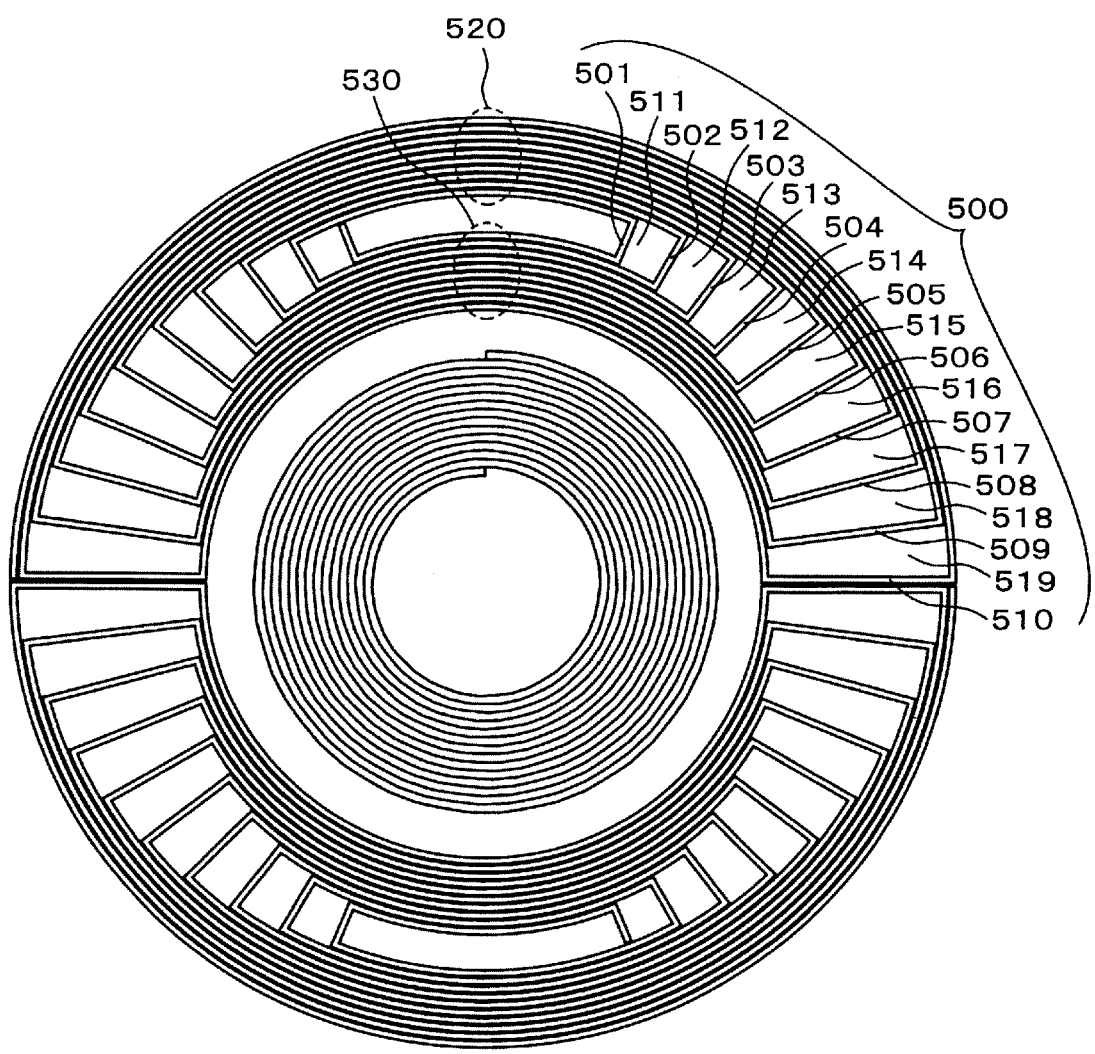
FIG. 18 is a plan view of an excitation coil and a transformer coil disposed at a rotor section according to a fifth embodiment of the present invention viewed from the axial direction.
Figure 19:
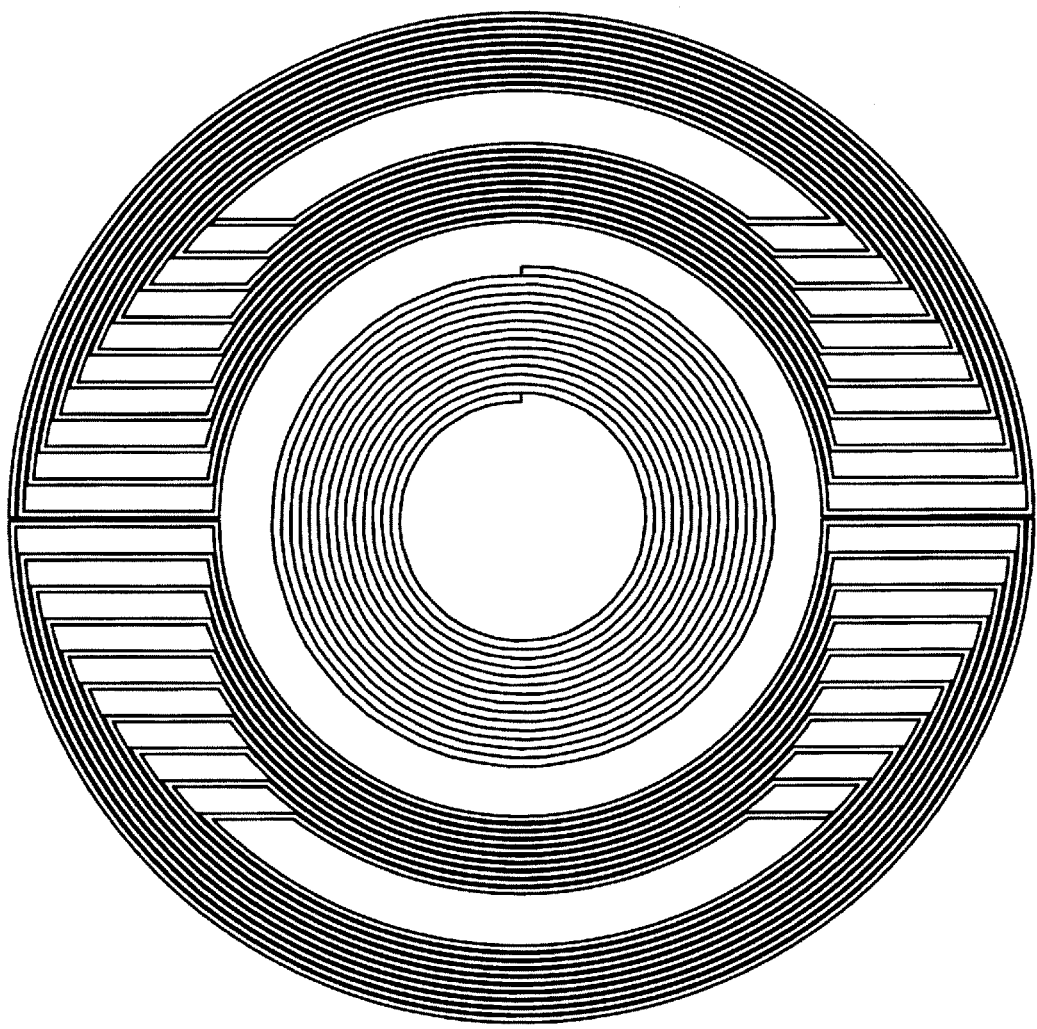
FIG. 19 is a plan view of an excitation coil and a transformer coil disposed at a rotor section according to a variation of the fifth embodiment viewed from the axial direction.

Specifically, referring to FIG. 18, a turn-back pattern portion 500 includes ten turn-back pattern conductors 501 to 510 which have the same width as pattern conductors of outer and inner circumferential pattern portions 520 and 530, wherein distances 511 to 519 each defined between adjacent two of the turn-back pattern conductors 501 to 510 are increased so that the width (entire width) of the turn-back pattern portion 500 is larger than the width (entire width) of the outer and inner circumferential pattern portions 520 and 530. FIG. 19 shows a variation of the fifth embodiment of FIG. 18, where all turn-back pattern conductors are arranged parallel to one another in line with the outermost turn-back pattern conductor while two adjacent turn-back pattern conductors are spaced apart from each other at a increased distance.

In the fifth embodiment and also the variation thereof, the same effect can be obtained as in the fourth embodiment and its variations. Further, since the resistance value of the entire pattern can be increased (due to the current pathway becoming narrower when regarded as one pattern) compared with the fourth embodiment, the output voltage can be set higher.

In the fifth embodiment described above, the distances each defined between adjacent two of the turn-back pattern conductors are identical to one another, but the present invention is not limited to such an equal distance arrangement and the distances may differ from one another. This arrangement is effective, for example, in getting the output waveform closer to a sine wave.

According to a further embodiment of the present invention in which the width (entire width) of the turn-back pattern portion is set larger than the width (entire width) of the outer and inner circumferential pattern portions, the arrangement may be such that the conductor width of the turn-back pattern portion and the distance defined between two adjacent conductors of the turn-back pattern portion are larger than respectively the conductor width and the distance between two adjacent conductors of the outer and inner circumferential pattern portions. This arrangement also is advantageous in getting the output waveform closer to a sine wave.

The present invention does not have to use the above described combinations of adjustment of the width of the turn-back pattern conductor and the distance defined between adjacent two of the turn-back pattern conductors. Any arbitrary combination of the width adjustment and the distant adjustment may be used for the purpose of optimally getting the output waveform closer to a sine waveform. Also, the present invention is not limited in coil pattern structure of the stator section to the pattern structures of the embodiments described above, and, for example, the conventional two-layer structure including a sine phase coil pattern layer and a cosine phase coil pattern layer disposed separately from each other (refer to Japanese Patent Application Laid-Open No. H8-136211) may be applicable.

The present invention is not limited in axial multiple angle to 1X, and 2X and more may be applicable. In this connection, however, it is to be noted that when the axial multiple angle is large, the circumferential length of the coil is small and therefore the effect of magnetic flux varying heavily at the both circumferential ends of the coil is relatively reduced. Accordingly, the present invention is remarkably advantageous especially for a sheet coil type resolver having a small axial multiple angle (2X or less, especially 1X).

The present invention does not have to be structured such that the resolver coil is disposed at the outer side and the transformer coil is disposed at the inner side, and may alternatively be structured such that the resolver coil is disposed at the inner side and the transformer coil is disposed at the outer side. Also, the present invention is not limited in turn-back pattern shape to the embodiments described above. For example, the turn-back pattern may have an elliptical edge. Further, each of the coil patterns may be structured of one layer or three layers or more, rather than two layers.

In the embodiments described above, a single phase input and two phase output structure is used where the rotor section is excited and a sine phase output and a cosine phase output are obtained at the stator section, but a two phase input and single phase output structure may alternatively be used where a sine excitation signal and a cosine excitation signal are applied respectively to the sine-phase coil and the cosine-phase coil of the stator section, and a waveform formed by the synthesis of the signals of the two phases is detected at the rotor section.

The structure of the turn-back pattern portion 423 shown in FIG. 12 may be applied to the resolver stator coil 1236 (refer to FIG. 10). In this case, the second resolver rotor coil 1217, while can surely be structured as shown in the figure, may have a conventionally usual structure. If the structure of the turn-back patter portion 423 is applied to the resolver stator coil 1236, the detailed dimension of the turn-back pattern portion may be adjusted and set so that the output generated by the rotation of the rotary shaft has a sine waveform.

While the present invention has been illustrated and explained with respect to specific embodiments thereof, it is to be understood that the present invention is by no means limited thereto but encompasses all changes and modifications that will become possible within the scope of the appended claims.

For example, in the embodiments described above, the resolver rotor coil portion and the resolver stator coil portion which in combination constitute the resolver coil are both structured of the same layer coil structure, either two layer coil pattern or single layer coil pattern, but may alternatively be structured of different number of coil patterns from each other (for example, the resolver rotor coil portion is of two layer structure and the resolver stator portion is of single layer structure).

Also, the coil patterns of the resolver rotor coil portion and the resolver stator coil portion do not have a spiral shape as illustrated in the drawings but may have various modified shapes.

Moreover, in the embodiments described above, n=4 in the axial multiple angle nX, and the mechanical angle between the sine phase and cosine phase coils adjacent to each other is represented by (90/(m×n)) degrees where m=1 and n=4, but the present invention is not limited to m=1. When m=2, for example, each of the resolver stator coil patterns 236a to 236p and the resolver stator coil patterns 237a to 237p is made of two spiral coil patterns connected to each other so as to generate respective magnetic fluxes having the same direction when current is applied. Specifically, for example, the resolver stator coil pattern 236a may be substituted with two spiral coil patterns which have the same shape, are disposed circumferentially and which are connected in series or parallel to each other.

This application claims priority from Japanese Patent Application No. 2009-147028, filed Jun. 19, 2009 and Japanese Patent Application No. 2009-194144, filed Aug. 25, 2009, which are incorporated herein by reference in their entirety.

What is claimed is:

1. A sheet coil type resolver comprising:
a resolver stator coil portion comprising a plurality of stator coil patterns which have a planar shape and each of which has at least one spiral coil pattern and which are disposed circumferentially on a same plane, wherein the plurality of stator coil patterns constitute a coil group of two phases having a phase difference of a mechanical angle of 90 degrees from each other; and
a resolver rotor coil portion disposed to axially oppose the resolver stator coil portion with a distance therebetween;
wherein the plurality of stator coil patterns are disposed such that a stator coil pattern of a first phase and a stator coil pattern of a second phase are arranged alternately on the same plane, and
wherein the resolver rotor coil portion comprises a plurality of rotor coil patterns which have a planar shape and each of which has at least one spiral coil pattern, each of the rotor coil patterns have an area size corresponding to a sum area size of two adjacent stator coil patterns, and the rotor coil patterns are circumferentially connected in series to one another thereby constituting a coil group of one phase.

2. A sheet coil type resolver according to claim 1, wherein the resolver stator coil portion is arranged such that two adjacent stator coil patterns are circumferentially shifted from each other by a mechanical angle of (90/(m×n)) degrees in case of a resolver axial multiple angle of nX where n is an integer of one or more and m is an integer of one or more.

3. A sheet coil type resolver according to claim 1, wherein the resolver stator coil portion comprises a plurality of stator coil pattern layers, the plurality of stator coil patterns constituting the coil group of two phases are formed in each of the plurality of stator coil pattern layers and at the same time connected to one another between the stator coil pattern layers, and wherein a number of the stator coil patterns to constitute the coil group of two phases in one stator coil pattern layer is identical to a number of the stator coil patterns to constitute the coil group of two phases in any of other stator coil pattern layers.

4. A sheet coil type resolver according to claim 1, wherein the resolver rotor coil portion comprises a plurality of rotor coil pattern layers, and the plurality of rotor coil patterns are formed in each of the plurality of rotor coil pattern layers and at the same time connected to one another between the rotor coil pattern layers.

5. A sheet coil type resolver according to claim 1, wherein the resolver rotor coil portion constitutes an excitation phase and the resolver stator coil portion constitutes a detection phase.

6. A sheet coil type resolver according to claim 1, wherein the resolver stator coil constitutes an excitation phase and the resolver rotor coil portion constitutes a detection phase.

7. A sheet coil type resolver according to claim 1, wherein the coil group of two phases comprises a sine phase coil group and a cosine phase coil group in each of which stator coil patterns of a same phase are disposed in every other position circumferentially on one same plane and connected in series to one another, two adjacent stator coil patterns on the one same plane are shifted circumferentially by a mechanical angle of 22.5 degrees, and wherein a resolver axial multiple angle is 4X.

8. A sheet coil type resolver according to claim 1, wherein each of at least one of the plurality of stator coil patterns and the plurality of rotor coil patterns has a substantially rectangular spiral shape and comprises an outer circumferential pattern portion, an inner circumferential pattern portion and a turn-back pattern portion connecting between the outer circumferential pattern portion and the inner circumferential pattern portion, and wherein the turn-back pattern portion has a larger pattern conductor width than the outer circumferential pattern portion and the inner circumferential pattern portion.

9. A sheet coil type resolver according to claim 8, wherein a layout of each of the turn-back pattern portions is arranged by means of adjusting, in accordance with a shape of the stator coil pattern, at least one of widths of the turn-back pattern conductors and distances respectively defined between two adjacent turn-back pattern conductors, whereby a waveform of an output signal whose amplitude varies according to a rotation angle of a rotor has a sine waveform.

10. A sheet coil type resolver according to claim 1, wherein each of the plurality of rotor coil patterns has a substantially rectangular spiral shape and comprises an outer circumferential pattern portion, an inner circumferential pattern portion and a turn-back pattern portion connecting between the outer circumferential pattern portion and the inner circumferential pattern portion, and the turn-back pattern portion has a larger pattern conductor width than the outer circumferential pattern portion and the inner circumferential pattern portion.

11. A sheet coil type resolver according to claim 10, wherein a layout of each of the turn-back pattern portions is arranged by means of adjusting, in accordance with a shape of the stator coil pattern, widths of the turn-back pattern conductors, whereby a waveform of an output signal whose amplitude varies according to a rotation angle of a rotor has a sine waveform.

12. A sheet coil type resolver according to claim 11, wherein the widths of the turn-back pattern conductors are different from one another.

13. A sheet coil type resolver according to claim 10, wherein a layout of each of the turn-back pattern portions is arranged by means of adjusting, in accordance with a shape of the stator coil pattern, distances respectively defined between two adjacent turn-back pattern conductors, whereby a waveform of an output signal whose amplitude varies according to a rotation angle of a rotor has a sine waveform.

14. A sheet coil type resolver according to claim 13, wherein the distances respectively defined between two adjacent turn-back pattern conductors are different from one another.

15. A sheet coil type resolver according to claim 1, further comprising:
- a stator transformer coil portion formed on the same plane with the resolver stator coil portion, and
- a rotor transformer coil portion formed on the same plane with the resolver rotor coil portion.

16. A sheet coil type resolver comprising:
- a resolver stator coil portion comprising a plurality of stator coil patterns which have a planar shape and each of which has at least one spiral coil pattern and which are disposed circumferentially on a same plane, wherein the plurality of stator coil patterns constitute a coil group of two phases having a phase difference of a mechanical angle of 90 degrees from each other; and
- a resolver rotor coil portion disposed to axially oppose the resolver stator coil portion with a distance therebetween;
- wherein the plurality of stator coil patterns are disposed such that a stator coil pattern of a first phase and a stator coil pattern of a second phase are arranged alternately on the same plane,
- wherein the resolver rotor coil portion comprises a plurality of rotor coil patterns which have a planar shape and each of which has at least one spiral coil pattern, and the rotor coil patterns are circumferentially connected in series to one another thereby constituting a coil group of one phase, and
- wherein the plurality of rotor coil patterns, the plurality of stator coil patterns of the first phase, and the plurality of stator coil patterns of the second phase are equal in number.

* * * * *